United States Patent
Ishii et al.

(10) Patent No.: US 8,692,666 B2
(45) Date of Patent: Apr. 8, 2014

(54) COMMUNICATION SYSTEM AND COMMUNICATION TERMINAL

(75) Inventors: Hirofumi Ishii, Sagamihara (JP); Masamitsu Fujimaru, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 413 days.

(21) Appl. No.: 13/205,286

(22) Filed: Aug. 8, 2011

(65) Prior Publication Data
US 2012/0032795 A1 Feb. 9, 2012

(30) Foreign Application Priority Data

Aug. 9, 2010 (JP) ................................. 2010-178835
Aug. 24, 2010 (JP) ................................. 2010-187556

(51) Int. Cl.
*G08B 1/08* (2006.01)

(52) U.S. Cl.
USPC ........................................ 340/539.1; 348/159

(58) Field of Classification Search
USPC ........................................ 340/539.1; 348/159
See application file for complete search history.

(56) References Cited

U.S. PATENT DOCUMENTS

| | | | |
|---|---|---|---|
| 6,188,431 B1 * | 2/2001 | Oie | 348/211.5 |
| 7,742,074 B2 * | 6/2010 | Minatogawa | 348/207.1 |
| 7,765,296 B2 * | 7/2010 | Yoshida et al. | 709/224 |
| 7,920,169 B2 * | 4/2011 | Jung et al. | 348/211.1 |
| 8,350,946 B2 * | 1/2013 | Jung et al. | 348/333.02 |
| 2004/0001148 A1 * | 1/2004 | Takemoto | 348/211.8 |
| 2005/0036034 A1 * | 2/2005 | Rea et al. | 348/207.1 |
| 2005/0193421 A1 * | 9/2005 | Cragun | 725/80 |
| 2013/0093897 A1 * | 4/2013 | Fan et al. | 348/159 |

FOREIGN PATENT DOCUMENTS

| | | |
|---|---|---|
| JP | 2006-236176 | 9/2006 |
| JP | 2007-028077 | 2/2007 |
| JP | 2007-173963 | 7/2007 |

* cited by examiner

*Primary Examiner* — Eric M Blount
(74) *Attorney, Agent, or Firm* — John C. Pokotylo; Straub & Pokotylo

(57) ABSTRACT

A camera system includes a plurality of first cameras and a second camera. Each of the plurality of first cameras has a first receiving section that receives a control signal, a first image pickup section that photographs a first image based on the control signal, and a first transmitting section that transmits the first image and terminal information based on the control signal. The second camera has a second image pickup section that photographs a second image, a second transmitting section that transmits the control signal, a second receiving section that receives the first image and the terminal information, a camera selecting section that selects the first camera that satisfies a predetermined condition as control target camera based on the terminal information, and a storing section that stores the second image.

20 Claims, 16 Drawing Sheets

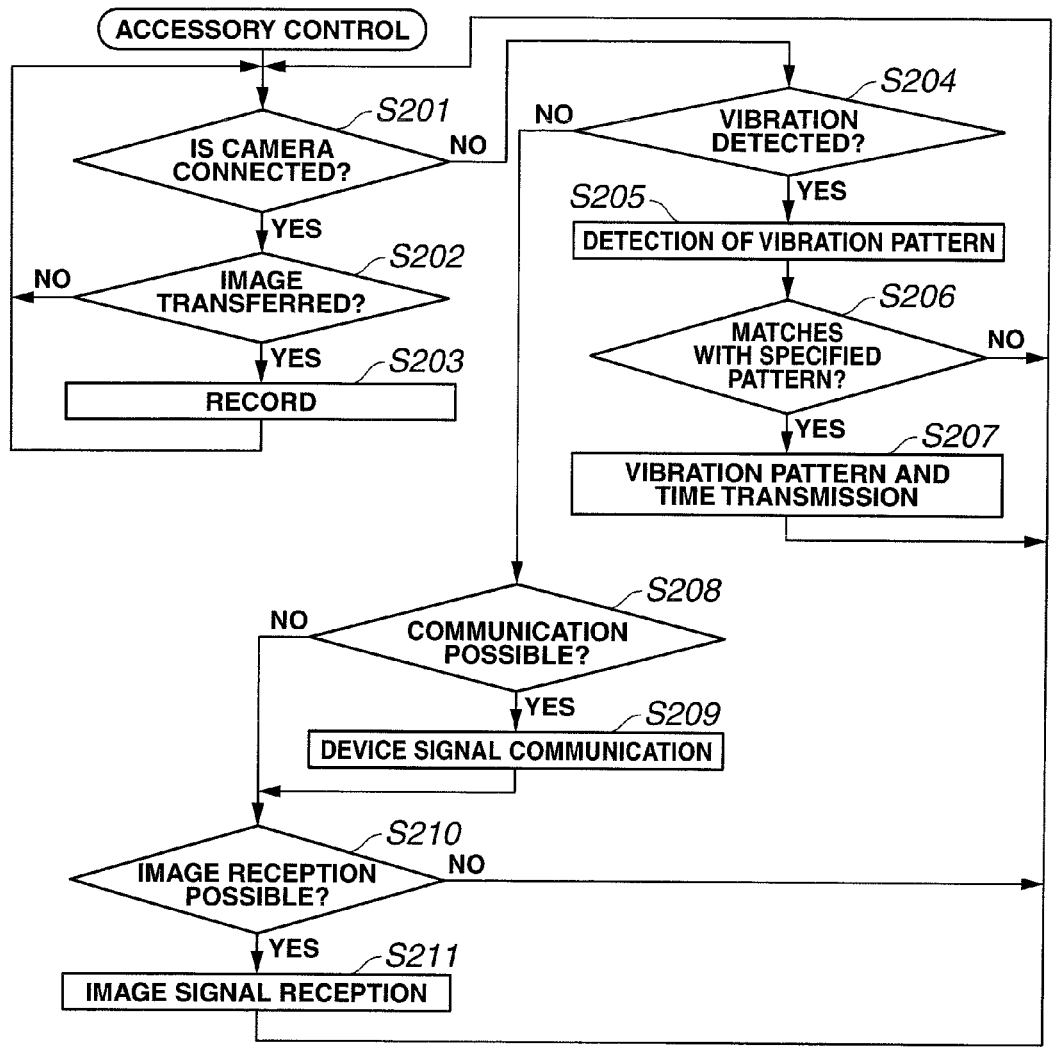

COMMUNICATION SYSTEM AND COMMUNICATION TERMINAL

CROSS REFERENCE TO RELATED APPLICATION

This application claims the benefit of Japanese Application No. 2010-178835 filed in Japan on Aug. 9, 2010, and Japanese Application No. 2010-187556 filed in Japan on Aug. 24, 2010, the contents of which are incorporated herein by this reference.

BACKGROUND OF THE INVENTION

1. Field of the Invention

The present invention relates to a communication system that includes a plurality of communication terminals, and to a communication terminal of the communication system.

2. Description of the Related Art

When a plurality of photographers photograph the same subject, for example, a specific person, at the same time, many photographers gather close to the individual that is the subject and a crowd of people is formed. As a result, it is difficult to photograph a desired image from a position that is at a distance from the subject because the crowd of people obstructs the view of the subject. It is also difficult for photographers that are close to the subject to move to another place to photograph the subject from a different position.

In this connection, in Japanese Patent Application Laid-Open Publication No. 2007-173963, the present applicant discloses a method that uses two cameras, in which an image that is photographed by one camera is received by another camera.

As described above, a communication terminal such as a digital camera that can transfer various kinds of data such as photographed image data to another terminal through wireless communication is known In this case, technology for specifying a communicable terminal is one of the important communication technologies. For example, Japanese Patent Application Laid-Open Publication No. 2007-28077 discloses a method for specifying a communication target that detects a feature value of a face from facial image data of a user of another communicable terminal, and automatically sets address data corresponding to the person that matches the detected feature value. Since facial image data is used, a communication target can be definitely specified. Further, because a complicated input operation which involves a risk of erroneous input, such as the input of address data, is unnecessary, the possibility of erroneous transmission is decreased.

SUMMARY OF THE INVENTION

A communication system according to an embodiment of the present invention includes: a plurality of first communication terminals that respectively have a first receiving section that receives a control signal, a first image pickup section that photographs a first image based on the control signal, and a first transmitting section that transmits the first image and apparatus information based on the control signal; and a second communication terminal that has a second image pickup section that photographs a second image, a second transmitting section that transmits the control signal, a second receiving section that receives the first image and the apparatus information, a terminal selecting section that selects the first communication terminal that satisfies a predetermined condition from among the plurality of first communication terminals as a control target terminal based on the apparatus information, and a storing section that stores the second image.

A communication terminal according to another embodiment of the present invention includes: a terminal selecting section that, from among a plurality of first communication terminals that respectively have a first receiving section that receives a control signal, a first image pickup section that photographs a first image based on the control signal, and a first transmitting section that transmits the first image and terminal information based on the control signal, selects the first communication terminal that satisfies a predetermined condition as a control target terminal based on the terminal information; a second image pickup section that photographs a second image; a second transmitting section that transmits the control signal; a second receiving section that receives the first image and the terminal information, and a storing section that stores the second image.

A communication terminal according to a further embodiment of the present invention includes: a communication section that performs wireless communication with a plurality of other communicable terminals; a vibration information detecting section which has a vibration detecting section that detects a vibration and selects a first vibration pattern type that is similar to a detected vibration pattern from among a plurality of predetermined vibration pattern types, and a timing section that clocks a vibration detection time, and which outputs first vibration information including the first vibration pattern type and a vibration detection time; a control section that specifies one or more communication candidate terminals from among the communicable terminals based on the first vibration information that the vibration information detecting section outputs and second vibration information that is received from the communicable terminal; and a display section that displays an image showing the one or more communication candidate terminals that the control section specifies.

BRIEF DESCRIPTION OF THE DRAWINGS

FIG. 16 is a flowchart that illustrates operations of the accessory according to the fifth embodiment;

FIG. 17 is a view for describing vibration patterns according to the fifth embodiment.

DETAILED DESCRIPTION OF THE PREFERRED EMBODIMENTS

<First Embodiment>

Hereunder, a camera system 1 that is a communication system and a camera 20 that is a communication terminal of the camera system 1 of a first embodiment are described.

Figure 1:
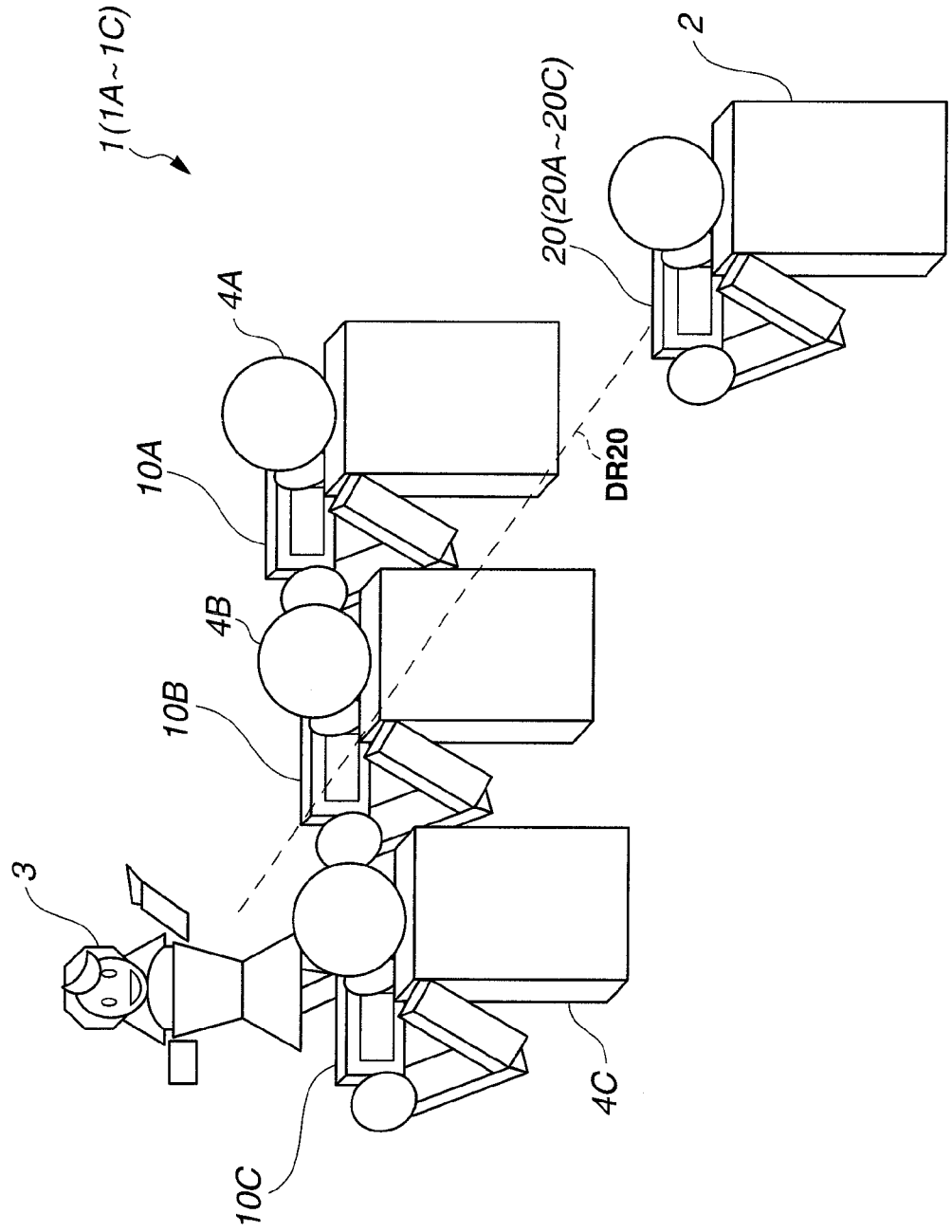
FIG. 1 is an explanatory view for explaining a usage pattern of a camera system according to a first embodiment.

As shown in FIG. 1, when a plurality of photographers 4A to 4C and 2 simultaneously photograph the same subject, for example, a specific individual 3, many photographers gather close to the individual 3 that is the subject, and a crowd of people is formed. As a result, since the crowd of people block a photographing direction DR20 of the camera 20 that is held by the photographer 2 in a position that is at a distance from the individual 3, it is difficult for the photographer 2 to photograph a desired image.

However, according to the camera system 1, images photographed by a plurality of cameras 10A to 10C that are first communication terminals can be received by and stored in the camera 20 that is a second communication terminal. In this connection, hereunder, when referring individually to a plurality of components that have the same function, a single alphabet character at the end of a symbol denoting the relevant component may be omitted. For example, the cameras 10A to 10C may each be referred to as "camera 10".

Figure 2:
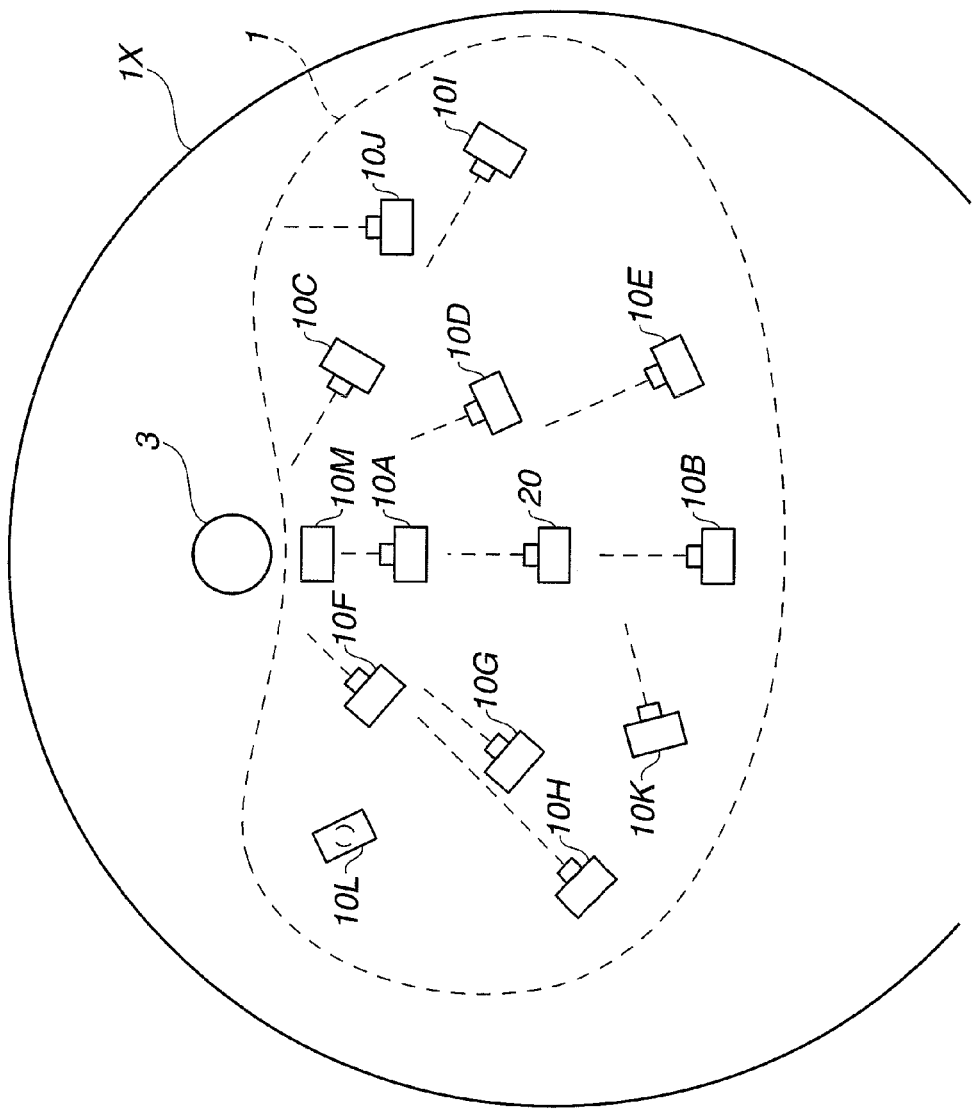
FIG. 2 is an explanatory view for explaining a usage pattern of the camera system according to the first embodiment.

As shown in FIG. 2, the camera system 1 includes a plurality of first cameras 10 and one second camera 20. In this case, the first cameras 10 are image-transmitting cameras and the second camera 20 is an image-receiving camera. As described later, although the first cameras 10 and the second camera 20 may be cameras that have the same functions, in the following description the first cameras 10 and the second camera 20 may be differentiated to facilitate the description.

Not all of the plurality of first cameras 10 shown in FIG. 2 are facing in a direction in which it is possible to photograph the individual 3. For example, the image pickup directions of first cameras 10I to 10K are not directions that face the individual 3.

Therefore, the second camera 20 selects the first cameras 10 that satisfy a predetermined condition of facing in the direction of the individual 3 as control target cameras from among the plurality of first cameras 10 in a wireless communicable range 1X. Subsequently, the second camera 20 receives and stores first images that have been photographed by the control target cameras. The operations of the camera system 1 and the like are described in detail later.

Figure 3:
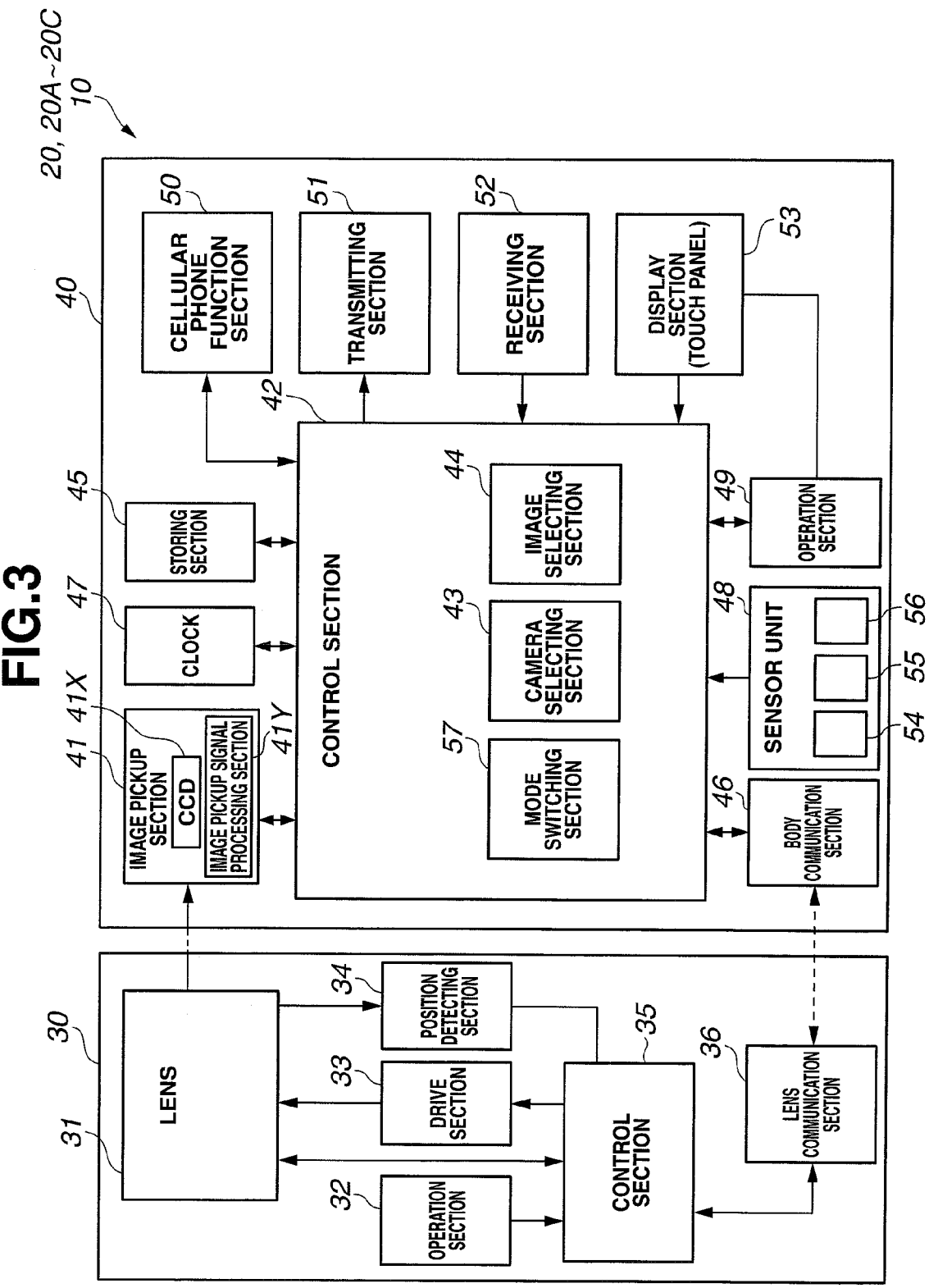
FIG. 3 is a configuration diagram of a camera according to the first embodiment.

First, the configuration of the camera 20 (10) is described. As shown in FIG. 3, the camera 20 has an interchangeable lens 30 and a body 40. The camera 20 is not limited to a type in which a lens is interchangeable. In this connection, since the interchangeable lens 30 of the camera 20 is a general-purpose item, the interchangeable lens 30 is described briefly hereunder.

The interchangeable lens 30 includes a lens 31, an operation section 32, a drive section 33, a position detecting section 34, a control section 35, and a lens communication section 36. The lens 31 is, for example, a zoom lens that is constituted by a plurality of optical members, a diaphragm section, and the like. A user operation is transmitted to the control section 35 via the operation section 32, and the drive section 33 drives an aperture value (F-number), a focal point, an angle of view (zoom state) and the like of the lens 31. A zoom state, a focus state, and a diaphragm state of the lens 31 are detected by the position detecting section 34. The state of the lens 31 and the like is transmitted to the body 40 via the lens communication section 36. Note that an interchangeable lens other than the interchangeable lens 30 illustrated in FIG. 3 can also be mounted to the camera 20.

The body 40 has an image pickup section 41, a transmitting section 51, a receiving section 52, a camera selecting section 43 as an apparatus selecting section, an image selecting section 44, a storing section 45, a display section 53, a touch panel of the display section 53 and an operation section 49 that are input sections, a clock 47, a body communication section 46, a sensor unit 48, a mode switching section 57, and a cellular phone function section 50. The sensor unit 48 includes, for example, a direction sensor 54, a GPS sensor 55 as a positional information detecting sensor, and an acceleration sensor 56 as a posture detection sensor. In this connection, the sensor unit 48 need not have all of the aforementioned sensors.

Figure 4:
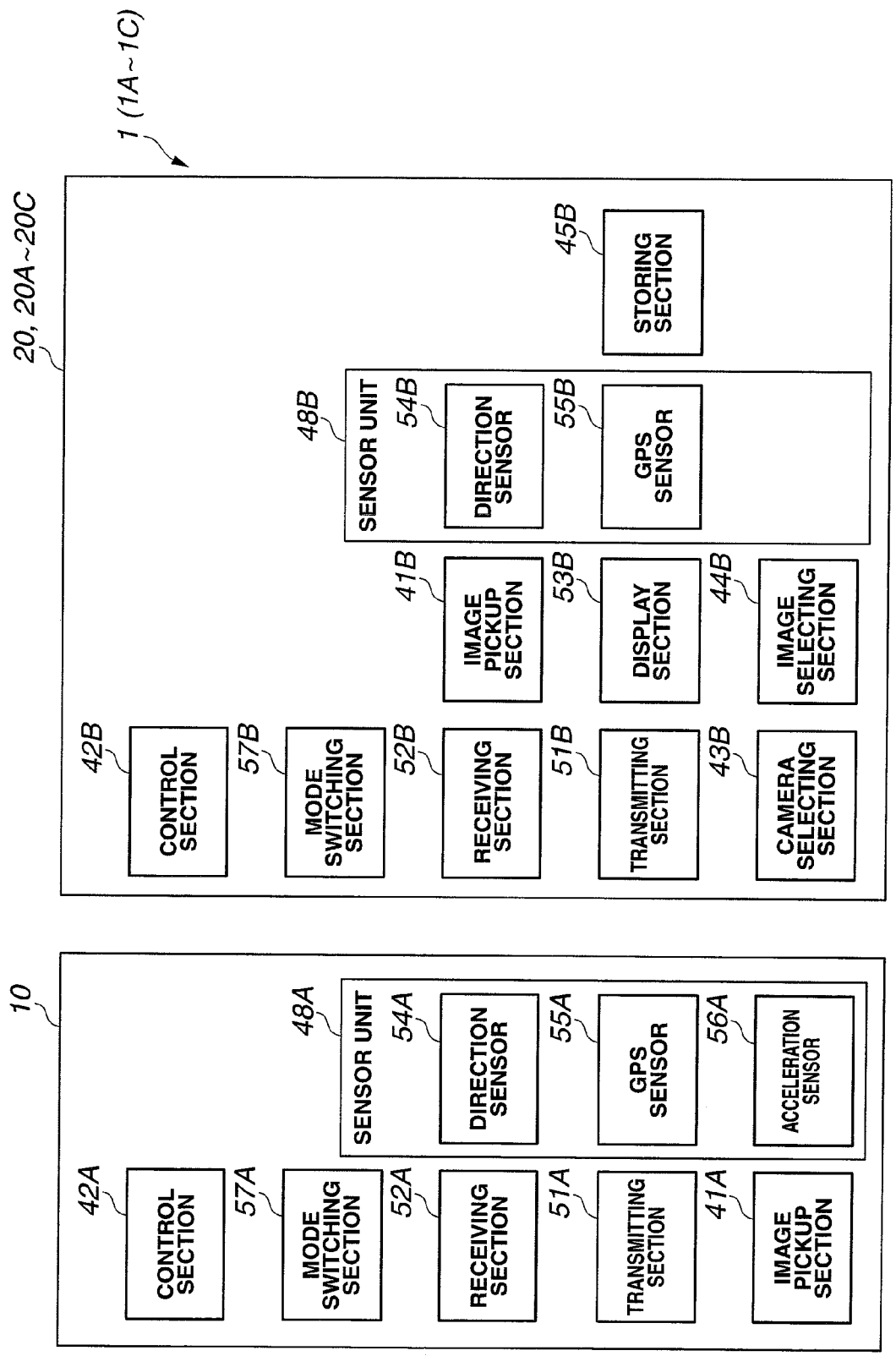
FIG. 4 is a configuration diagram for describing operations of the camera system according to the first embodiment.

In this connection, the image pickup section 41 is referred to as "first image pickup section" with respect to the camera 10 and is referred to as "second image pickup section" with respect to the camera 20, the transmitting section 51 is referred to as "first transmitting section" with respect to the camera 10 and is referred to as "second transmitting section" with respect to the camera 20, and the receiving section 52 is referred to as "first receiving section" with respect to the camera 10 and is referred to as "second receiving section" with respect to the camera 20. Further, as shown in FIG. 4, with respect to the symbols of the components shown in FIG. 3 and the like, the character "A" is added to the end of the symbols of the components of the first camera 10, and the character "B" is added to the end of the symbols of the components of the second camera 20. For example, the first image pickup section of the first camera 10 is referred to as "image pickup section 41A", and the second image pickup section of the second camera 20 is referred to as "image pickup section 41B".

Note that the respective components of the body 40 need not be constituted by respectively independent hardware. For example, with respect to components such as the camera selecting section 43, a program stored in a storing section such as an unshown ROM or in a storage medium may be read out by a CPU to implement the functions of the respective components. That is, a configuration may be adopted in which a CPU constitutes the control section 42, and the control section 42 has the functions of the respective components as its own functions.

The image pickup section 41 has a CCD 41X that is a solid image pickup device that picks up an image of a subject through the lens 31, and an image pickup signal processing section 41Y that processes an image pickup signal and outputs an image signal. The CCD 41X outputs a color image pickup signal by detecting light of the three colors of red (R), green (G), and blue (B) with respectively different devices. A CMOS image pickup device or the like may also be employed as the solid image pickup device. The image pickup section 41 may output not only still images, but may also output a moving image that is constituted by a plurality of still images obtained by repeatedly performing photographing at a predetermined frame rate. In this connection, an image photographed by the camera 10 is a first image, and an image photographed by the camera 20 is a second image.

In the camera 10, the transmitting section 51 transmits the first image and terminal information based on a control signal. In the camera 20, the transmitting section 51 transmits the control signal. In the camera 10, the receiving section 52 receives the control signal. In the camera 20, the receiving section 52 receives the first image and terminal information. A camera information signal is described in detail later.

Preferably, transmitting and receiving of signals by the transmitting section 51 and the receiving section 52 is performed by wireless communication, particularly short-range wireless communication. For example, by using the Bluetooth (registered trademark) system, only the cameras 10 that are in the wireless communicable range 1X that is between 10 and 100 meters from the camera 20 are control target cameras that are control target terminals (communication target communication terminals).

Preferably, the transmitting section 51 and the receiving section 52 of the cameras 10 (20) can perform transmitting and receiving processing with a plurality of communication counterparts (cameras) at the same time.

The camera selecting section 43 selects a camera 10 that satisfies a predetermined condition from among the plurality of cameras 10 as a control target camera based on camera information that is terminal information. The image selecting section 44 selects one first image to be stored in the storing section 45 from among a plurality of first images. The display section 28 displays an image before photographing and an image during photographing, i.e. a through image, and also displays an image after photographing. The camera 20 can also display an image on, for example, a TV through an unshown external terminal.

The direction sensor 54 is, for example, a geomagnetic sensor, and detects a direction in which the image pickup section 41 picks up an image The GPS sensor 55 detects a position of the camera 10, for example, the latitude and longitude thereof. In this connection, a sensor that detects a position of the camera 10 based on a radio wave from a cellular phone base station or a radio wave from a predetermined radio wave source and has a higher accuracy than a GPS sensor may be employed as the positional information detecting sensor. The acceleration sensor 56 detects an angle of elevation in a direction in which the image pickup section 41 picks up an image, that is, an angle from the horizon.

The mode switching section 57 switches between a share mode that permits control based on the control signal from another camera and a private mode that does not permit control based on the control signal from another camera, in accordance with a user operation that is performed through the operation section 49. More specifically, even if the camera has a share mode function, the camera 10 stops functioning as an image-transmitting camera if the user does not wish the camera to be used as an image-transmitting camera.

The cellular phone function section 50 has a function as an ordinary cellular phone. More specifically, the cameras 10 (20) may be a part of the functions of a cellular phone. Further, the cameras 10 (20) may be a part of the functions of a portable information terminal apparatus or the like.

Figure 5:
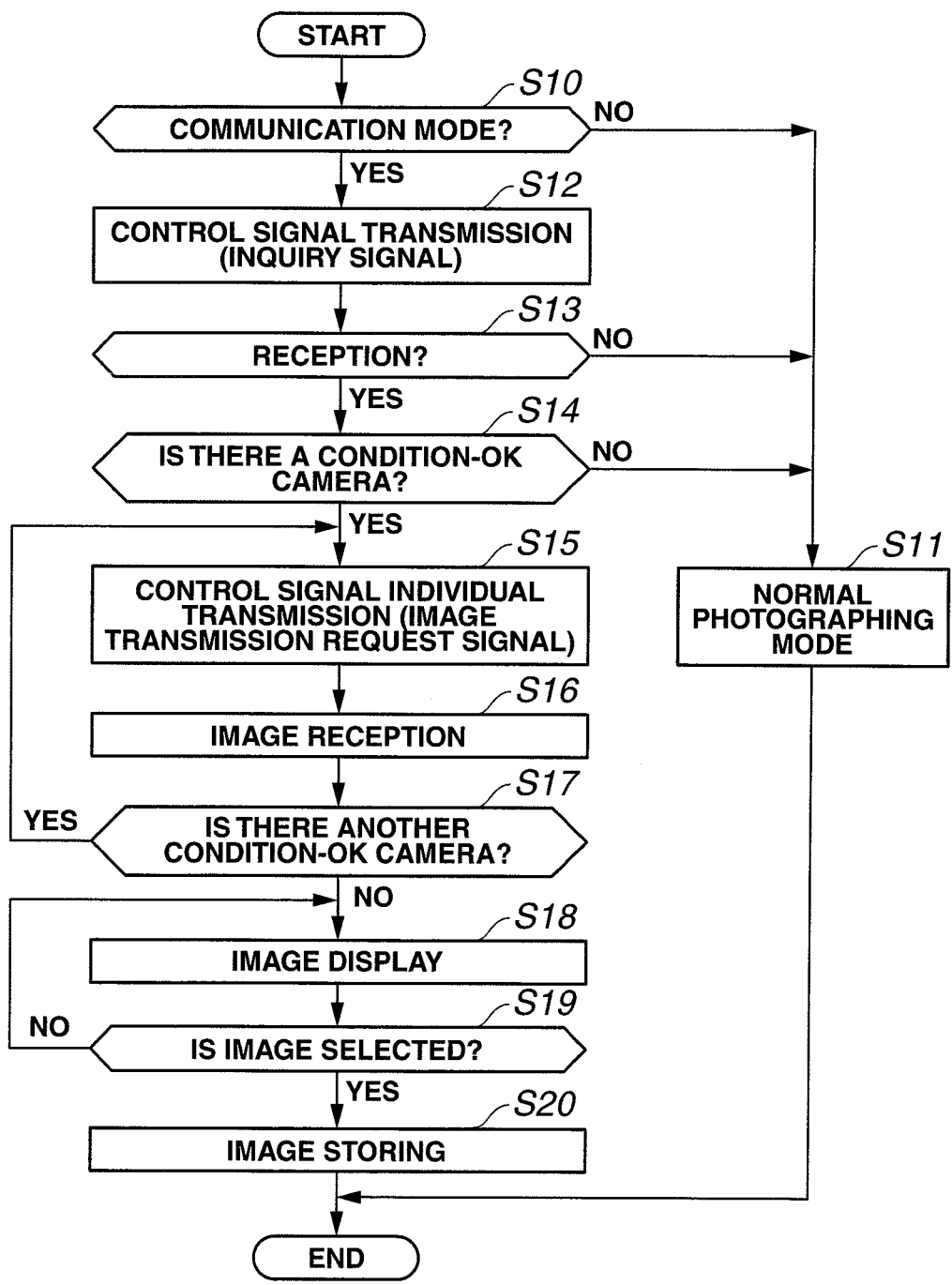
FIG. 5 is a flowchart for describing a flow of processing of the camera system according to the first embodiment.

Next, the flow of processing of the camera system 1 is described according to the configuration diagram in FIG. 4 and the flowchart in FIG. 5. Note that among the components of the first camera 10 and the second camera 20, only the components that are related to the following explanation are shown in FIG. 4. More specifically, only the components that are necessary as an image-transmitting camera are shown as components of the first camera 10, and only the components that are necessary as an image-receiving camera are shown as components of the second camera 20.

<Step S10>Communication Mode?

When the mode switching section 57B of the camera 20 is set to share mode (communication mode), processing is performed from step S12. In contrast, when the mode switching section 57B of the camera 20 is not set to share mode, that is, when the mode switching section 57B is set to private mode, normal processing is performed in step S11.

<Step S12>Control Signal Transmission

The second transmitting section 51B of the camera 20 transmits the control signal based on an operation performed by the photographer 2 at the operation section 49. The control signal is an inquiry signal that inquires whether there is a control target camera candidate in the communicable range 1X. The cameras 10 that receive the inquiry signal transmit the camera information signal as a response signal to the first transmitting section 51A.

<Step S13>Response Signal Received?

If the second receiving section 52B of the camera 20 can not receive the camera information signal from another camera (No), normal processing is performed from step S11. If the second receiving section 52B receives the camera information signal (Yes), the processing in step S14 is performed.

<Step S14>Is There a Condition-OK Camera?

At the camera 20, based on the camera information signal of the camera 10 that the second receiving section 52B receives, the camera selecting section 43B determines whether or not the camera 10 that transmitted the camera information signal satisfies a predetermined condition. In this case, it is preferable that the user 2 can set the predetermined condition through the operation section 49. For example, the predetermined condition may be that a subject that the second image pickup section 41B of the camera 20 photographs and a subject that the first image pickup section 41A of the camera 10 photographs are the same. If there is no camera that satisfies the predetermined condition (No), normal processing is performed from step S11.

Here, various methods can be used to determine whether the two cameras 10 and 20 are photographing the same subject. For example, a photographing direction DR10 that the direction sensor 54A of the camera 10 detects may be received as the camera information signal by the camera 20, and if the photographing direction DR10 matches a photographing direction DR20 that the direction sensor 54B of the camera 20 detects, the camera selecting section 43B may determine that the cameras 10 and 20 are photographing the same subject. In this connection, the term "photographing directions match" means that the photographing directions are within a predetermined range, for example, a range of ±20 degrees, with respect to each other.

Note that when the camera selecting section 43B makes a determination based only on a photographing direction, among the plurality of cameras 10 shown in FIG. 2, for example, three cameras 10A, 10B and 10J are selected, wherein an angle θ with respect to the north direction (N direction: geomagnetic pole direction) is the same as an angle θ0 of the camera 20. More specifically, although the camera 10J is not photographing the individual 3, the camera 10J is mistakenly selected as a control target camera. However, in a subsequent step the user can view a first image that is photographed by the camera 10J and determine that the camera 10J is not a control target camera.

In this connection, in order to select a control target camera as a control target terminal with less error, for example, a configuration may be adopted in which positional information (latitude: Xn, longitude: Yn) that is detected by the GPS sensor 55A of the camera 10 and transmitted is received as the camera information signal by the camera 20, and is processed together with positional information (latitude: X0, longitude: Y0) that is detected by the GPS sensor 55B of the camera 20.

Figure 6:
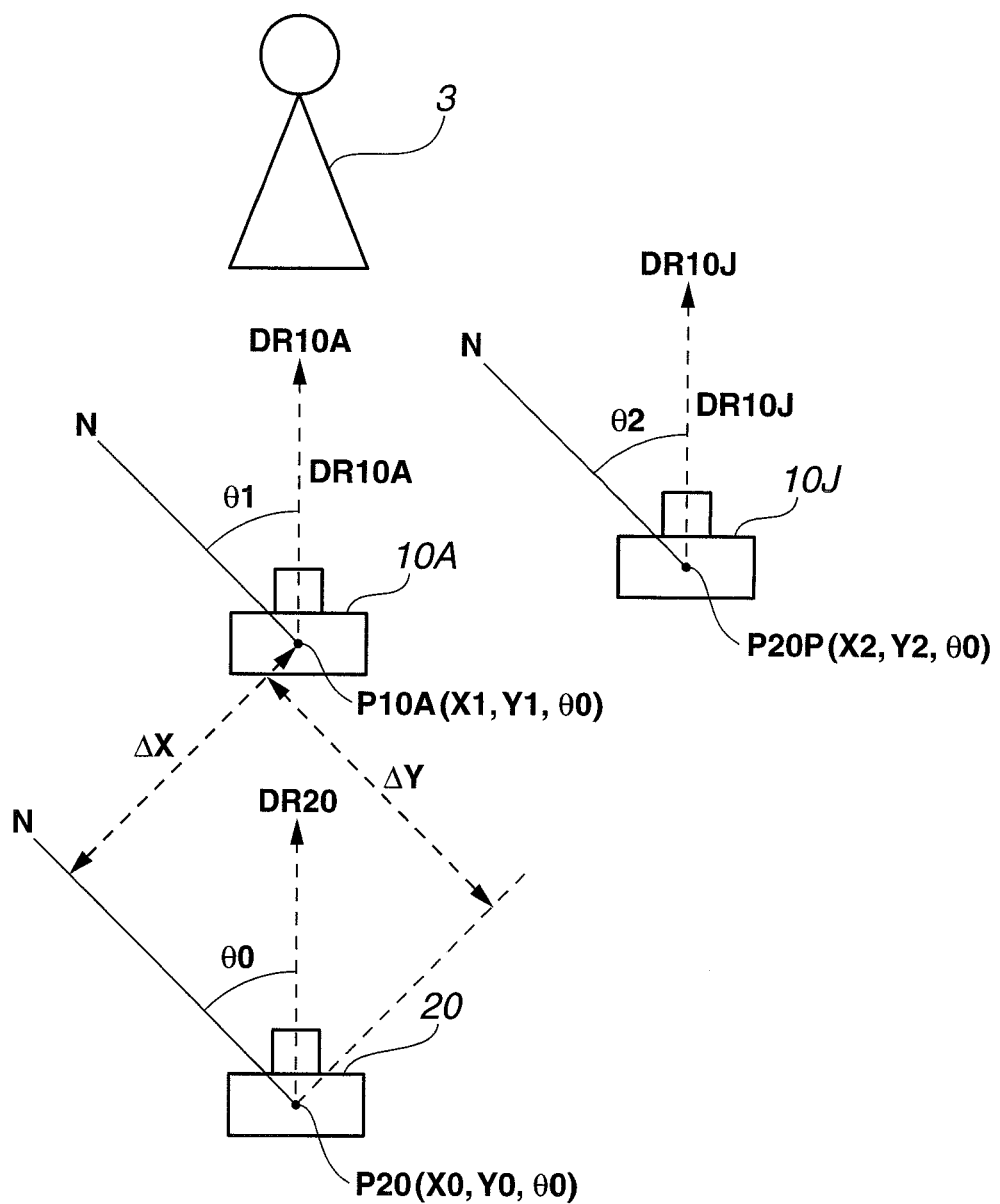
FIG. 6 is an explanatory view for explaining positional states of cameras in the camera system according to the first embodiment.

That is, as shown in FIG. 6, although an angle 00 with respect to the north direction (N direction) at the camera 10J is the same as at the camera 20, the camera 10J does not satisfy the following equation 1.

$$\Delta Y \times \tan \theta 0 = \Delta X \qquad \text{(equation 1)}$$

Here, θ is, for example, an angle from the north direction, ΔX is a distance between the cameras along a line of longitude (south-north direction), and ΔY is a distance between the cameras along a line of latitude (east-west direction).

More specifically, the camera selecting section 43B selects a camera that is at the angle θ0 and that satisfies the above equation 1 as a control target camera.

Information regarding a distance D between the individual 3 and the camera may also be used as the camera information signal. The control section 42 calculates the distance D, for example, based on a focusing lens position when the camera is in a focused state. The distance D may also be measured using an unshown distance-measuring sensor such as an infrared distance-measuring sensor or an ultrasound distance-measuring sensor.

Further, it is preferable that an elevation angle, i.e. an angle from the horizon, at which the image pickup section 41A picks up an image, which is detected by the acceleration sensor 56 of the first camera 10, is used as a selection condition of the camera selecting section 43B. More specifically, for example, although a camera 10M in FIG. 2 appears to be facing in a direction in which the individual 3 can be photographed, the camera 10M is not facing the individual 3, but is facing a direction that is far above or below the individual 3. By using information of a posture detection sensor that detects a posture of the camera as the camera information signal, the camera selecting section 43B can select a control target camera with less error.

As described above, a control target camera is selected by using various sensors of the cameras in the camera system 1.

<Step S15>Control Signal (Image Transmission Request Signal) Transmission

If there is a first camera 10 that satisfies the predetermined condition (S14: Yes), the second transmitting section 51B transmits an image transmission request signal as the control signal to the first camera 10 that is a control target. More specifically, the camera information signal includes an ID number or the like that is unique to each camera, and the second transmitting section 51B specifies an ID number and transmits the image transmission request signal.

<Step S16>Image Reception

The control section 42A of the first camera 10 that receives the image transmission request signal through the first receiving section 52A executes control so as to photograph a first image and transmit the first image through the first transmitting section 51A. The second camera 20 receives the first image that the first camera 10 has photographed and transmitted, through the second receiving section 52B.

<Step S17>Is There Another Condition-OK Camera?

If there is a plurality of cameras 10 that satisfy the predetermined condition, the processing from step S15 is repeated. More specifically, the second camera 20 receives a plurality of first images that are photographed by the plurality of first cameras 10, respectively.

<Step S18>Image Display

Figure 7:
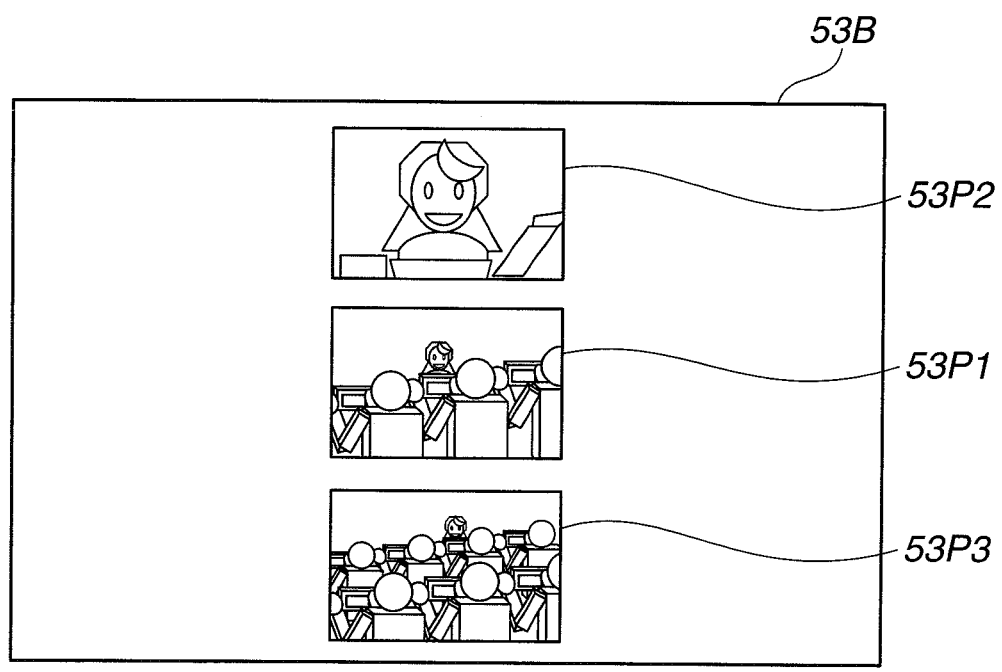
FIG. 7 is a view that illustrates a display screen of a camera according to the first embodiment.

The control section 42B of the second camera 20 displays the received first image(s) on the display section 53B. As a display form, for example, a plurality of images including a second image may be displayed in order on the display section 53B. As another display form, preferably, as shown in FIG. 7, a second image 53P1 is displayed in the center of the display section 53B, a first image 53P2 that has been photographed from a position close to the individual 3 is displayed above the second image, and a first image 53P3 that has been photographed from a position that is far from the subject is displayed below the second image 53P1. More specifically, preferably, the display form of the display section 53B that displays images that a plurality of cameras have photographed corresponds to the relative positional relationship among the plurality of cameras. The aforementioned display form facilitates selection of a desired image.

For example, in FIG. 7, the first image 53P2 is an image that has been photographed by the camera 10A shown in FIG. 2, and the first image 53P3 is an image that has been photographed by the camera 10B. In this connection, the back of the photographer 2 is photographed in the first image 53P3.

If there are an even greater number of first images, the first images may be displayed diagonally above or diagonally below the second image 53P1, or a plurality of screens that display images may be switched and displayed.

<Step S19>Is Image Selected?

The user selects a desired image from among a plurality of first images that are displayed on the display section 53B through the image selecting section 44B. If there is only one first image, the image selecting section 44B may automatically select the first image.

<Step S20>Image Storing

A first image that is selected by the image selecting section 44B is stored in the storing section 45B.

As described above, the camera system 1 and the camera 20 can provide a comfortable photographing environment for the photographer. More specifically, photographing is enabled from a desired photographing position, and the photographer 2 is not subject to limitation of the photographing position of its own camera (position of camera 20). In other words, by merely setting the camera 20, the photographer 2 can obtain photographs of a subject that cannot be photographed using the camera 20 of the photographer 2. Further, since a large number of photographers do not rush close to the individual 3 that is the subject, congestion is alleviated.

Further, since the camera 20 of the camera system 1 selects control target cameras based on the camera information that is transmitted by a plurality of cameras 10 in the communicable range 1X, the camera 20 does not receive a large number of images that the photographer does not intend to receive. A camera ID number, direction information, posture information, positional information, focal distance information and the like can be appropriately selected as the camera information. Further, a configuration may also be adopted in which, in addition to a camera model number, an interchangeable lens model number, a focusing distance, a shutter speed, a diaphragm and the like as photographing information, the name of the possessor of the camera or a message or the like can be transmitted as the camera information according to a selection of the possessor.

As described in the foregoing, the camera 10 and camera 20 may be cameras that have the same functions. In such a case, a configuration may be adopted in which the camera 10 performs control based on the control signal from the camera 20 only when the camera 20 is set to share mode. More specifically, a configuration may be adopted so as to mutually permit control based on the control signal from another camera only when the relevant cameras are in a "give and take" relationship.

Furthermore, the cameras 10 may be unmanned cameras that are disposed around the individual 3 that is the subject as dedicated image-transmitting cameras. More specifically, a plurality of the cameras 10 that are unmanned cameras exclusively for transmitting may be previously arranged in the venue for the benefit of the photographer. In such a case, the camera 20 need not be set to share mode, and is set so as to be able to control the dedicated image-transmitting cameras and receive first images that the dedicated image-transmitting cameras photograph.

In this connection, preferably, the camera system 1 has a specification that enables the respective cameras to communicate with a plurality of other cameras at the same time,. For example, the Bluetooth (registered trademark) system enables one camera to connect to seven other cameras at the same time.

Therefore, for example, the first camera 10A can connect not only to the second camera 20, but also to another camera, for example, the first camera 10C at the same time. At this time, although the first camera 10A functions as an image-transmitting camera with respect to the second camera 20, the first camera 10A also functions as an image-receiving camera that controls the first camera 10C. Naturally, the first camera 10 that functions as an image-transmitting camera with respect to the second camera 20 can also control the second camera 20 as an image-transmitting camera at the same time.

<Second Embodiment>

Next, a camera system 1A and a camera 20A of a second embodiment of the present invention are described. Since the camera system 1A and the camera 20A of the present embodiment are similar to the camera system 1 and the camera 20 of the first embodiment, the same components are denoted by the same reference symbols, and a description of such components is omitted.

As described above, in the camera system 1 of the first embodiment, transmitting and receiving of signals is performed twice between the camera 20 and the camera 10. In contrast, transmitting and receiving of signals is performed only once according to the camera system 1A of the present embodiment.

Figure 8:
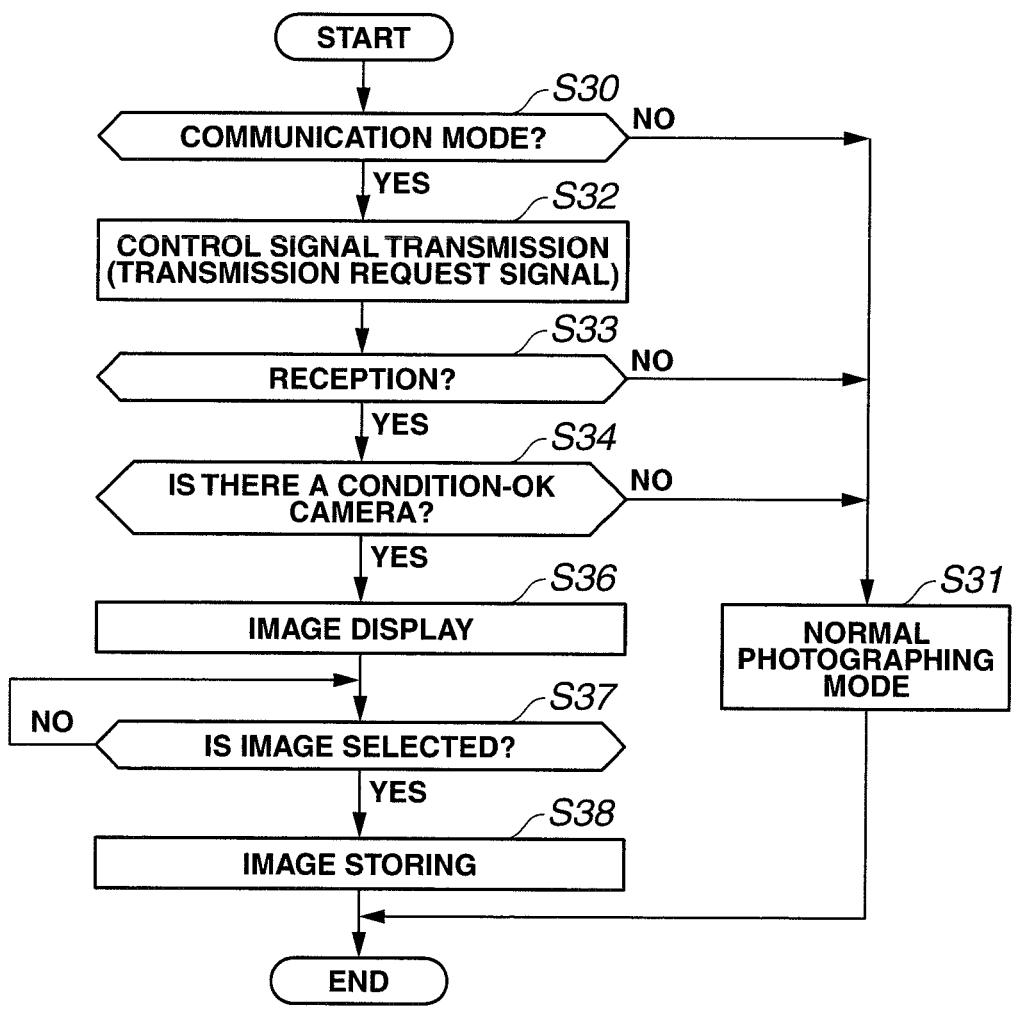
FIG. 8 is a flowchart for describing a flow of processing of a camera system according to a second embodiment.

FIG. 8 illustrates a flow of processing in the camera system 1A of the present embodiment. As shown in FIG. 8, in the camera system 1A of the second embodiment, the camera 20A transmits a camera information/image transmission request signal (transmission request signal) as a control signal in step S32. The camera 10 that receives the control signal transmits an image to which the camera information is attached. More specifically, transmitting and receiving of signals is performed only once between the camera 10 and the camera 20A.

The camera system 1A and camera 20A of the present embodiment have the same advantages as those of the camera system 1 and the camera 20 of the first embodiment, and since transmitting and receiving of signals is performed only once, high-speed processing is enabled and control is simple.

<Third Embodiment>

Next, a camera system 1B and a camera 20B of a third embodiment of the present invention are described. Since the camera system 1B and the camera 20B of the present embodiment are similar to the camera system 1 and the camera 20 of the first embodiment, the same components are denoted by the same reference symbols, and a description of such components is omitted.

Figure 9:
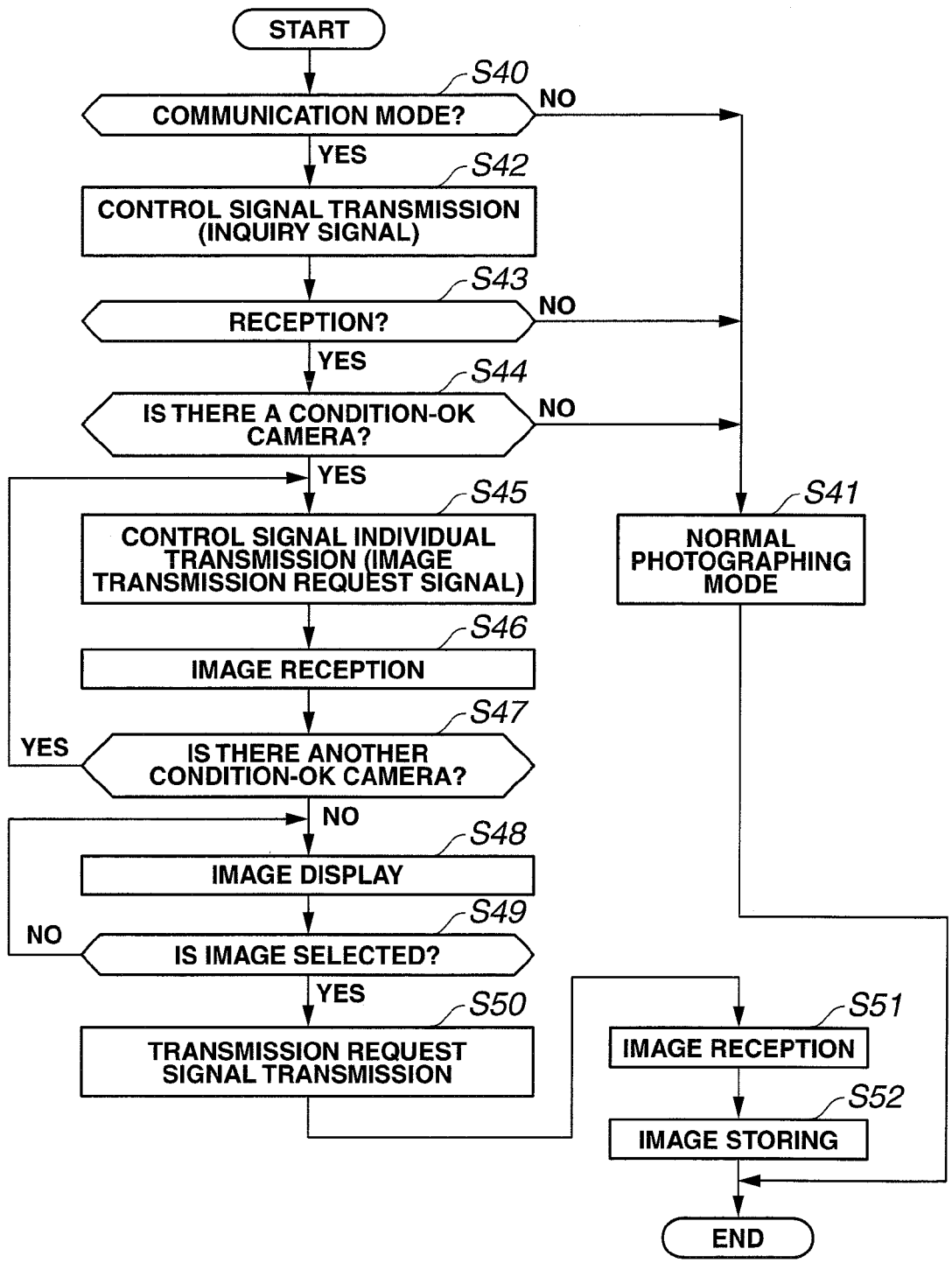
FIG. 9 is a flowchart for describing a flow of processing of a camera system according to a third embodiment.

FIG. 9 illustrates a flow of processing in the camera system 1B of the present embodiment.

According to the camera system 1B of the present embodiment, in step S50 a transmission request signal that is a control signal is transmitted again to a camera 10 that is selected by the camera selecting section 43B and which is further selected by the photographer 2 using the image selecting section 44B from among a plurality of first cameras 10. The camera 10 that receives the transmission request signal performs photographing processing anew and transmits an image.

According to the camera system 1B, a configuration can be adopted so that an image that the camera 10 initially transmits and is received by the camera 20B in step S46 is a so-called thumbnail image that has a low resolution and a small volume, while an image that is transmitted and received the second time in step S51 is a high resolution image. More specifically, the camera system 1B can improve the processing speed. Further, a configuration may be adopted so that the image that is transmitted initially is a still image and the image that is transmitted the second time is a moving image.

The camera system 1B and camera 20B of the present embodiment have the same advantages as those of the camera system 1 and the camera 20 of the first embodiment, and can improve the processing speed and also enable photographing of moving images.

<Fourth Embodiment>

Next, a camera system 1C and a camera 20C of a fourth embodiment of the present invention are described. Since the camera system 1C and the camera 20C of the present embodiment are similar to the camera system 1 and the camera 20 of the first embodiment, the same components are denoted by the same reference symbols, and a description of such components is omitted.

According to the camera system 1 and the camera 20 of the first embodiment, the camera 20 selects the cameras 10 that photograph the individual 3 as the same subject from the same photographing direction. In contrast, as long as a camera photographs the same subject, the camera system 1C and the camera 20C of the present embodiment may select a camera even if the photographing directions are different. That is, the photographer 2 that has the camera 20 can photograph a subject from a plurality of different angles while being in one place.

Figure 10:
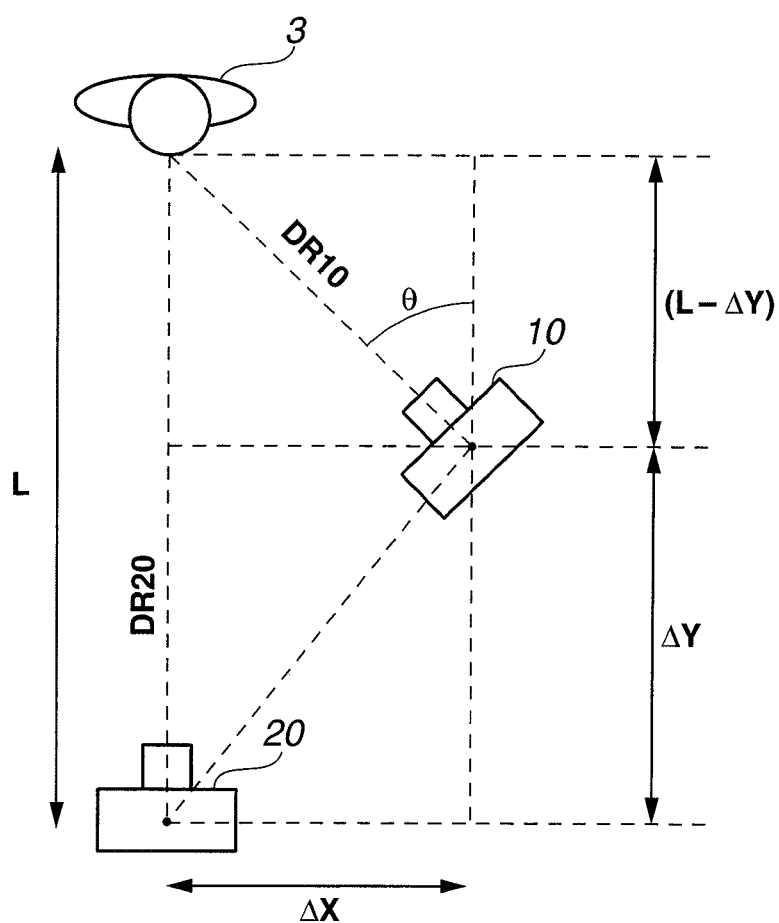
FIG. 10 is an explanatory view for explaining positional states of cameras in a camera system according to a fourth embodiment.

More specifically, with respect to the cameras 10 shown in FIG. 2, the camera selecting section 43B of the camera 20C also selects the cameras 10C, 10D, 10E, 10F, 10G, 10H and 10I. A determination as to whether or not the same individual 3 is being photographed is made using a sensor function of the sensor unit 48. For example, as shown in FIG. 10, if the following equation 2 is satisfied, the camera selecting section 43B determines that the two cameras are photographing the same subject.

$$\Delta X = (L - \Delta Y) \times \tan \theta \qquad \text{(equation 2)}$$

Here, L represents a distance between the camera 20 and the subject; $\Delta Y$ represents a distance between the camera 10 and the camera 20 along a straight line that links the camera 20 and the subject, in other words along the photographing direction DR20 of the camera 20; $\Delta X$ represents a distance between the camera 10 and the camera 20 along a direction that is orthogonal to the photographing direction DR20; and $\theta$ is an angle of a photographing direction DR10 of the camera 10 with respect to the photographing direction DR20.

Further, when the subject is a person, the control section 42 may determine whether or not the subject is the same person by means of a facial recognition system or the like based on the first image and the second image.

Figure 11:
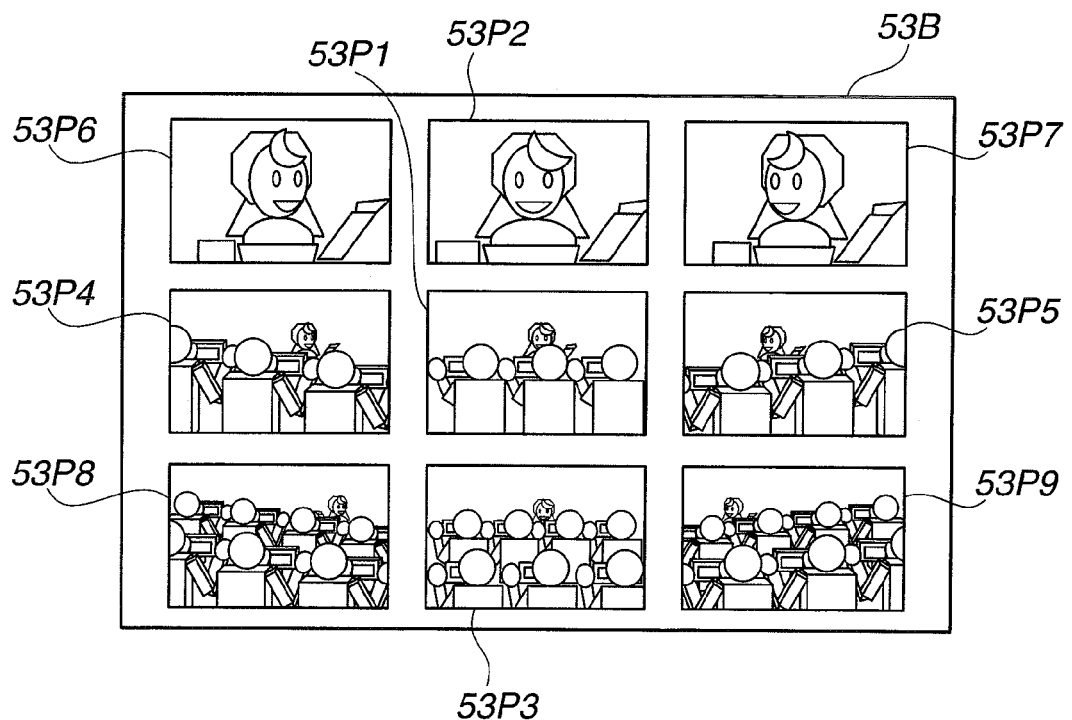
FIG. 11 is a view that illustrates a display screen of a camera according to the fourth embodiment.

As shown in FIG. 11, in the camera 20C of the camera system 1C, preferably, a second image 53P1 is displayed in the center of the display section 53B, a first image 53P2 that has been photographed from a position close to the individual 3 is displayed above the second image, a first image 53P3 that has been photographed from a position that is far from the subject is displayed below the second image 53P1, a first image 53P4 that has been photographed from a position that is further to the left side than the camera 20 is displayed on the left of the second image 53P1, and a first image 53P5 that has been photographed from a position that is further to the right side than the camera 20 is displayed on the right of the second image 53P1.

In FIG. 11, eight images 53P2 to 53P9 that have been photographed with eight cameras 10 are displayed on the display section 53B in a condition in which the eight images 53P2 to 53P9 are disposed in the same relative positional relationship as that of the eight cameras 10 with respect to the camera 20C. The above described display form facilitates selection of a desired image.

The camera system 1C and camera 20C of the present embodiment have the same advantages as those of the camera system 1 and the camera 20 of the first embodiment, and are also capable of photographing a subject from a greater range of angles, and can thus provide a more comfortable photographing environment.

<Fifth Embodiment>

Next, a fifth embodiment of the present invention is described referring to the drawings.

Figure 12:
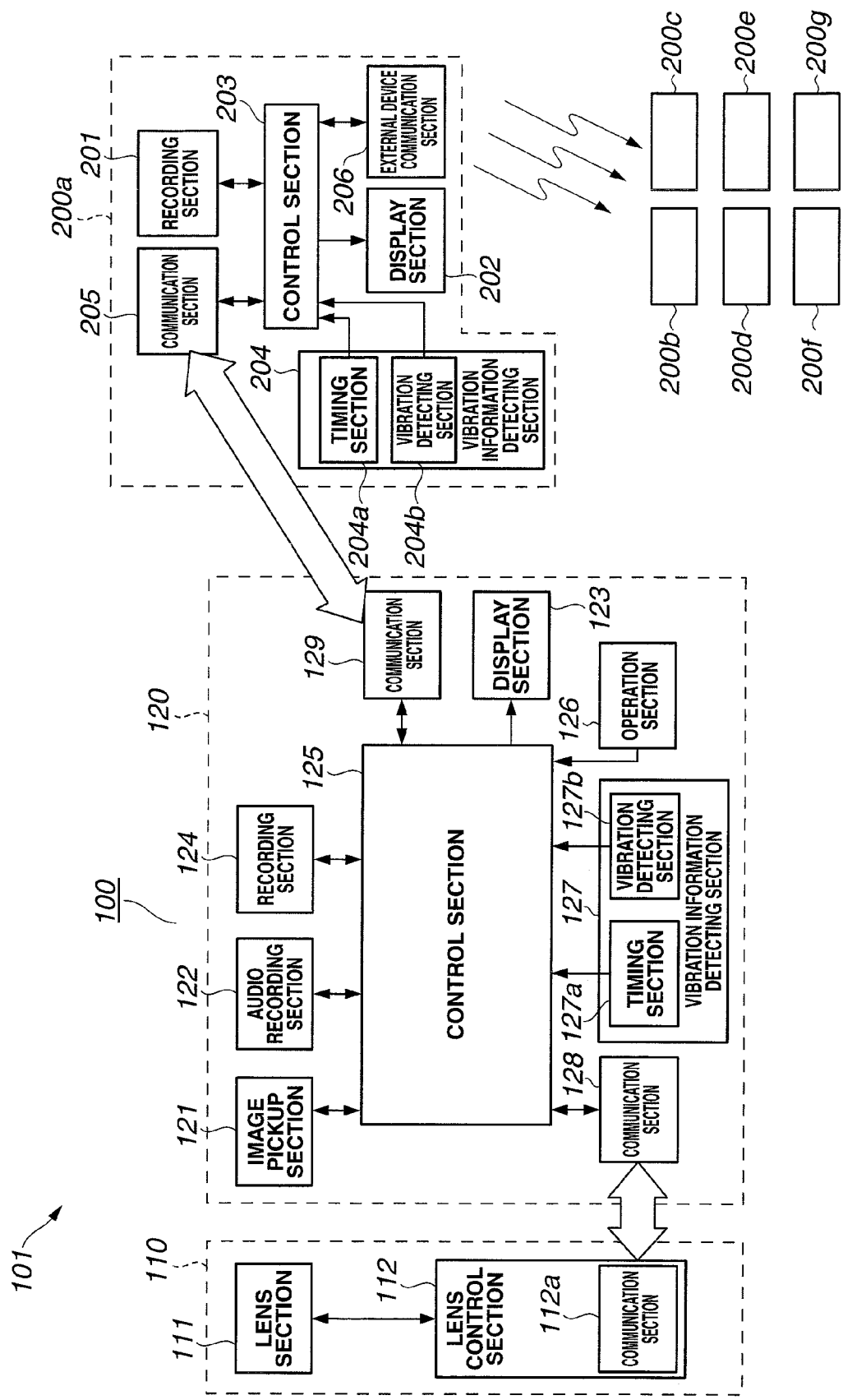
FIG. 12 is a view for describing a configuration of a communication system that has communication terminals according to a fifth embodiment.

As shown in FIG. 12, a camera 100 that is a communication terminal of the present embodiment constitutes a communication system 101 together with a plurality of accessory apparatuses (hereunder, referred to as "accessory") 200a to 200g that are communicable terminals that can perform wireless communication with each other.

According to the communication system 101, a vibration that is generated at the camera or the like by an action of a user that manually holds the camera 100 or an accessory 200a to 200g is detected, and is utilized when specifying a communication candidate terminal as a communication counterpart candidate.

Figure 13:
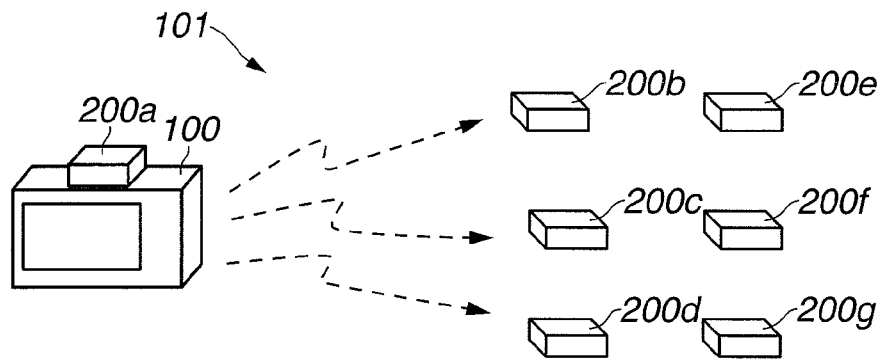
FIG. 13 is a view that shows a state in which an accessory is mounted to a camera according to the fifth embodiment.

Each of the accessories 200a to 200g can be detachably mounted to the camera 100. As shown in FIG. 13, when the accessory 200a is attached to the camera 100, the camera 100 is communicably connected to the accessory 200a. Consequently, an image file that is obtained with the camera 100 can be transferred to the accessory 200a. Naturally, even when the accessory 200a is mounted to the camera 100, the accessory 200a is capable of wireless communication with the other accessories 200b to 200g.

The camera 100 includes an interchangeable lens 110 and a main body 120. The interchangeable lens 110 is detachably mounted to the main body 120, and operates in accordance with control of the main body 120.

The interchangeable lens 110 has a lens section 111 and a lens control section 112. The lens section 111 is an optical system for causing a light flux from an unshown subject to be incident on an image pickup section 121 of the main body 120, and is constituted by a plurality of lenses and a diaphragm. The lens control section 112 controls the lens section 111 in accordance with a lens control signal that is inputted from the main body 120 through a communication section 112a.

The main body 120 has the image pickup section 121, an audio recording section 122, a display section 123, a recording section 124, a control section 125, an operation section 126, a vibration information detecting section 127, a communication section 128, and a communication section 129. The image pickup section 121 performs photoelectric conversion of a light flux that is incident through the lens section 111 to acquire image data. The audio recording section 122 has a microphone or the like, and converts sound into electrical signals to acquire audio data. The display section 123 is constituted by, for example, a liquid crystal display (LCD) or an organic EL display (OELD), and displays various kinds of images. The recording section 124 is, for example, a nonvolatile memory, and records various kinds of data such as an image file and an audio file that the control section 125 generates.

The control section 125 is constituted by, for example, a CPU, and executes various kinds of processing of the main body 120 in accordance with the contents of operations at the operation section 126. The control section 125 also has a function of an image processing section that performs image processing with respect to image data acquired by the image pickup section 121, and a function of an audio processing section that performs audio processing with respect to audio data acquired by the audio recording section 122. In addition, the control section 125 has a function of a display control section that controls images that are displayed on the display section 123. The operation section 126 includes various operation members that the user of the camera 100 uses to input various operation instructions to the main body 120. For example, the operation section 126 includes various operation members such as a power supply button that turns the power supply on or off, a release button that is used to input a photographing instruction, a mode button that sets an operation mode, and a selection button that performs various kinds of selections. When the display section 123 has a touch panel function, the display section 123 also constitutes the operation section 126. The control section 125 controls various kinds of processing according to the contents of operations of the operation section 126.

The vibration information detecting section 127 has a timing section 127a and a vibration detecting section 127b, and outputs vibration information that is described later. The vibration detecting section 127b is a nine-axis motion sensor constituted, for example, by a triaxial acceleration sensor, a triaxial angular velocity sensor, and a triaxial geomagnetic sensor. The vibration detecting section 127b detects an action of the user that manually holds the main body 120 that has the vibration detecting section 127b, more specifically, a vibration occurring in the main body 120, as an electrical signal. That is, "vibration detection" means "acceleration change detection" or "action (motion) detection". Further, as described later, the vibration detecting section 127b selects a vibration pattern type (vibration pattern number) that is similar to a vibration pattern of a detected vibration from among a plurality of predetermined vibration pattern types that are previously stored (see FIG. 17). The timing section 127a clocks a vibration detection time at which the vibration detecting section 127b detects a vibration. More specifically, the vibration information detecting section 127 that detected a vibration outputs vibration information that includes a vibration pattern number and a vibration occurrence time. In this connection, the timing section 127a also clocks times other than a vibration detection time, for example, a photographing time and a sound recording time.

The communication section 128 is an interface for enabling the control section 125 to communicate with the interchangeable lens 110. The communication section 129 is, for example, a USB interface for enabling the control section 125 to communicate with an accessory that is connected to the main body 120.

The respective accessories 200a to 200g have a recording section 201, a display section 202, a control section 203, a vibration information detecting section 204, a communication section 205, and an external device communication section 206. Hereunder, to simplify the description, it is assumed that the accessories 200a to 200g have the same configuration as each other, and only the configuration of the accessory 200a is described. However, as long as the respective accessories 200a to 200g have the recording section 201, the control section 203, the vibration information detecting section 204, and the external device communication section 206, the remaining configuration of the respective accessories 200a to 200g need not be the same. Further, similarly to the accessory 200a, the accessories 200b to 200g may be mounted to respective cameras.

The respective cameras that the accessories 200b to 200g are mounted to and the camera 100 constitute the communication system 101 that includes a plurality of cameras that is similar to the camera system 1 of the first embodiment.

The recording section 201 records various kinds of data such as an image file that is generated by subjecting an image obtained by the camera 100 to image processing (for example, reduction processing). The display section 202 that has an LED or the like displays various states of the accessory 200a, such as whether the power supply is turned on or off. The control section 203 that is constituted by, for example, a CPU controls various kinds of processing of the accessory 200a.

The vibration information detecting section 204 detects vibration information that is generated in the accessory 200a. The vibration information detecting section 204 has a timing section 204a and a vibration detecting section 204b. The vibration detecting section 204b is constituted by, for example, a triaxial acceleration sensor. The vibration detecting section 204b detects an action of the user that manually holds the accessory 200a that has the vibration detecting section 204b, more specifically, a vibration generated in the accessory 200a, as an electrical signal, and selects a vibration pattern number based on the detected vibration. The timing section 204a clocks a vibration detection time at which the vibration detecting section 204b detects a vibration. In this connection, when the accessory 200a is mounted to the camera 100, a configuration may be adopted in which a vibration of the accessory 200a is detected as a vibration of the camera 100. More specifically, since the vibration information detecting section 204 of the accessory 200a has a similar function to the vibration information detecting section 127 of the camera 100, the vibration information detecting section 127 of the camera 100 is not an essential component.

The communication section 205 has, for example, a USB interface that performs wire communication with the camera 100. The external device communication section 206 has an interface that performs wireless communication such as Bluetooth (registered trademark) communication with other communication terminals such as the accessories 200b to 200g.

Figure 14A:
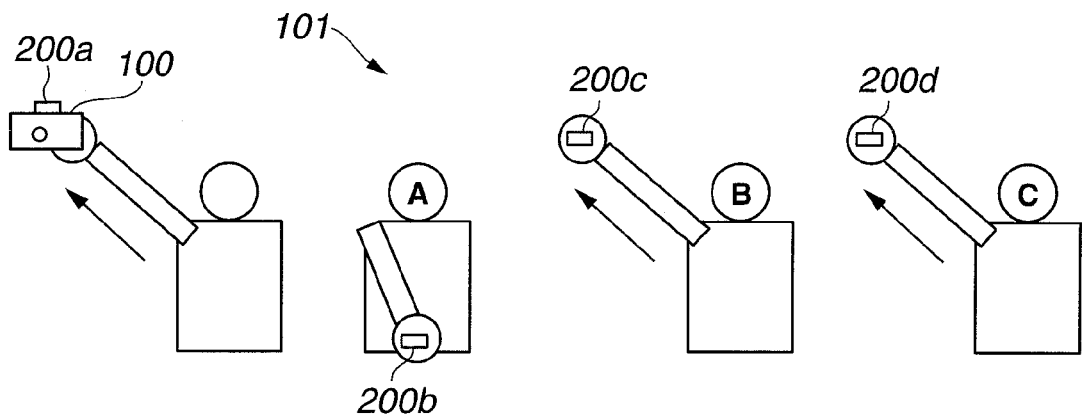
FIG. 14A is a view that shows an outline of operations of the communication system according to the fifth embodiment.
Figure 14B:
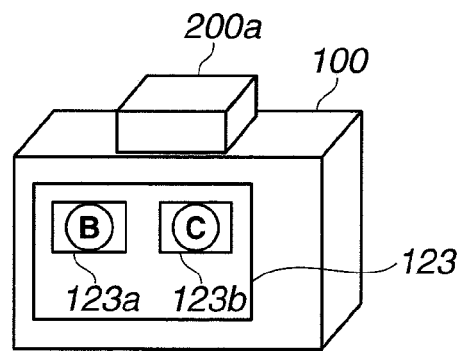
FIG. 14B is a view that shows an outline of operations of the communication system according to the fifth embodiment.

FIG. 14A and FIG. 14B are views that illustrate an outline of operations of the communication system 101 that has the camera 100. First, photographing is performed in a state in which the accessory 200a is mounted to the main body 120 of the camera 100. An image photographed by the camera 100 is stored in the recording section 124 and is also, for example, subjected to reduction processing and recorded as an image file in the recording section 201 of the accessory 200a. The image file recorded in the recording section 201 can be transmitted to other communication terminals such as the accessories 200b to 200g, a personal computer (PC), or a cellular phone by the external device communication section 206.

In a communication system which communicates with respective communication terminals separately when communicating with a plurality of communication terminals, the communication time is liable to be long and energy consumption is also liable to increase. Therefore, a system that communicates with a plurality of communication terminals at the same time is preferable. Further, in a system in which communication is performed only between communication terminals that wish to communicate, communication can be ended in a shorter time.

However, as described above, it has not always been easy to specify a communication-permitted terminal from among a plurality of communication terminals that are capable of communication (communicable terminals).

According to the present embodiment, in order to specify a communication candidate terminal, a person transmitting data and a person receiving the data perform the same specified action (hereunder, referred to as "specified action") and thereby specify a communication candidate terminal. More specifically, the user of the camera 100 performs a specified action with respect to the camera 100, and the user of the accessory also performs the same specified action as that at the camera 100 with respect to the accessory. The camera 100 regards only accessories at which a specified action is performed that is the same as the specified action performed at the camera 100 as communication candidate terminals that are candidates to serve as communication-permitted terminals. The user of the camera 100 then selects communication-permitted terminals that are granted permission to transmit and receive actual data, for example, image data, from among the specified communication candidate terminals via the operation section or the like.

In this case, the term "specified action" refers to, for example, an action whereby the user raises a hand in which the camera 100 is held upward, and the action is detected as a vibration (first vibration) generated in the camera 100 by the vibration detecting section 127b or the vibration detecting section 204b.

For example, the user of the camera 100 may previously notify another user of a specified action that the user of the camera 100 is going to execute from among specified actions for which vibration pattern numbers are registered in the recording section 124 of the camera 100 (see FIG. 17). Naturally, if the other user can see the specified action that the user of the camera 100 performs, an advance notification is unnecessary.

FIG. 14A shows an example in which, as a specified action, the user of the camera 100 raises a hand in which the camera 100 is held upward. If a vibration (first vibration) is generated in the camera 100 by the specified action, vibration information including the vibration pattern number of the first vibration and the vibration detection time of the first vibration is outputted from the vibration information detecting section 127.

If any of the users of the accessories 200b to 200g want to receive an image that is transmitted from the camera 100, the relevant users perform the same specified action as the user of the camera 100. FIG. 14A shows a state in which a user A of the accessory 200b does not perform the same specified action as the user of the camera 100, and a user B of the accessory 200c and a user C of the accessory 200d perform the same specified action as the user of the camera 100.

When a vibration (second vibration) is generated at the accessories 200b to 200g, respectively, similarly to the camera 100, the respective vibration information detecting sections 204 output second vibration information that includes a second vibration pattern number and a second vibration detection time. The accessories 200b to 200g wirelessly communicate the second vibration information that the vibration information detecting section 204 outputted, through the external device communication section 206. The second vibration information includes, for example, a vibration pattern number (see FIG. 17) that is determined according to the direction, size, and number of times of the vibration, and the vibration detection time.

The control section 125 of the camera 100 compares the first vibration information of the camera 100 and the respective items of second vibration information that are transmitted from the respective accessories 200b to 200g.

Subsequently, as shown in FIG. 14B, the control section 125 displays an image showing the accessories that have transmitted the second vibration information that has the same vibration pattern number as the first vibration information on the display section 123. In FIG. 14A, the user B of the accessory 200c and the user C of the accessory 200d perform the same specified action as the user of the camera 100. Consequently, an image 123a that shows the accessory 200c and an image 123b that shows the accessory 200d are displayed on the display section 123. For example, an image that is previously registered in the recording section 124 is used as the image that shows the accessories. As long as the respective accessories are distinguishable, the image that shows the accessory 200c may be a facial image of the user or may be a predetermined mark or the like. Further, when ID information of the respective accessories is transmitted together with the vibration information, the ID information may be displayed as text information.

From among the images that show the communication candidate accessories that are displayed on the display section 123, the user of the camera 100 selects one or more accessories as communication-permitted objects (communication-permitted terminals) which are permitted to receive image data that is actual data and not a control signal or authorization data or the like. The user of the camera 100 uses, for example, the touch panel of the display section 123 that is the operation section to select the one or more accessories as communication-permitted objects. Because the communication candidate terminals are graphically displayed, the user can easily distinguish between the communication candidate terminals. When communication candidate terminals are selected, the control section 125 performs control so as to transmit the image recorded in the recording section 201 of the accessory 200a to the selected accessories (communication-permitted terminals) at the same time.

Figure 15:
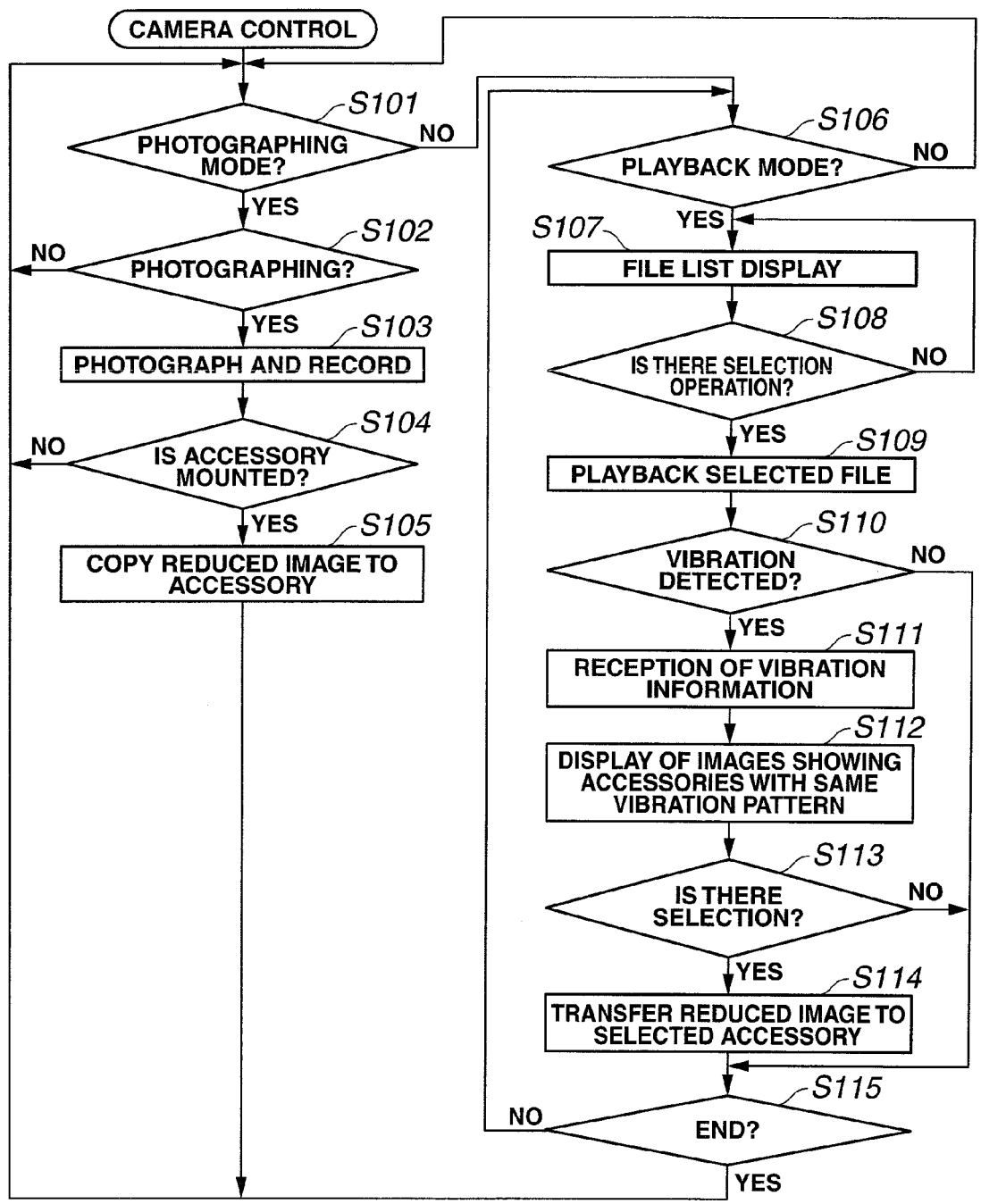
FIG. 15 is a flowchart that illustrates operations of the camera according to the fifth embodiment.

Next, the operations of the camera 100 are described using the flowchart shown in FIG. 15.

When the user performs an operation to turn the power supply on, the operations of the camera 100 start.

The control section 125 of the camera 100 first determines whether or not the operation mode of the camera 100 is a photographing mode (S101). The user sets the operation mode by, for example, operating the mode button of the operation section 126. If the operation mode is the photographing mode (S101: Yes), the control section 125 determines whether or not there is a photographing instruction (S102). A photographing instruction is, for example, an operation in which the user presses the release button of the operation section 126. If there is a photographing instruction (S102: Yes), after performing a series of photographing processes, the control section 125 records an image file obtained by photographing in the recording section 124 (S103). Further, in the case of photographing a moving image or the like, the control section 125 records an audio file obtained through the audio recording section 122 in the recording section 124 together with the image file.

After the image file is recorded in the recording section 124, the control section 125 determines whether or not an accessory is mounted to the camera 100 (S104). If an accessory is mounted (S104: Yes), the control section 125 subjects the image data obtained in step S103 to reduction processing to generate an image file for recording in the accessory 200a, and transmits the image file to the accessory 200a via the communication section 129 (S105). Thus, a resized image file of the image obtained by the camera 100 is recorded in the recording section 201 of the accessory 200a. In this connection, the reason for performing the reduction processing with respect to the image data is to make the wireless communication more efficient, and a configuration may also be adopted in which the reduction processing is not performed or in which compression processing is performed.

In S101, if the operation mode of the camera 100 is not the photographing mode (No), the control section 125 determines whether or not the operation mode is a playback mode (S106). If the operation mode is not the playback mode (S106: No), the processing returns to S101. In contrast, if the operation mode is the playback mode (S106: Yes), the control section 125 displays an image list (thumbnail images) of image files on the display section 123 (S107). In this case, if the accessory 200a is not mounted, the control section 125 displays an image list of image files that are recorded in the recording section 124. In contrast, if the accessory 200a is mounted, an image list of image files recorded in the recording section 201 is displayed. Hereunder, to simplify the description, it is assumed that the image list of the image files recorded in the recording section 201 is displayed.

After the image list is displayed, the control section 125 determines whether or not an image file is selected by the user (S108). If the selection operation is not performed (S108: No), the processing returns to S107 and the display of the list is continued. In contrast, if the selection operation is performed (S108: Yes), the control section 125 displays the selected image file in an enlarged form (S109). More specifically, the control section 125 expands the image data in the image file, and displays a large size image on the display section 123 based on the expanded image data.

After enlarging and displaying the selected image file, the control section 125 determines whether or not the vibration detecting section 127b or the vibration detecting section 204b has detected a vibration (S110). If the vibration is not detected (S110: No), the control section 125 skips the processing in steps S111 to S114. In contrast, if the vibration is detected (S110: Yes), the control section 125 instructs the accessory 200a to begin wireless communication with the other accessories 200b to 200g using the external device communication section 206 (S111).

Vibration information (vibration pattern number and vibration detection time) that is transmitted by the accessories 200b to 200g is received by the external device communication section 206 of the accessory 200a, and sent to the main body 120. The control section 125 compares the detected first vibration information with the respective items of second vibration information received from the respective accessories 200*b* to 200*g*.

As shown in the table in FIG. 17, the vibration information includes the vibration pattern number that is a vibration pattern type that is determined by, for example, a combination of a direction, size and number of times of a vibration. In this connection, in the vibration pattern processing shown in FIG. 17, either the size of a vibration or the direction of a vibration is used.

For example, an action as shown in FIG. 14A in which the user raises the camera 100 upward once is an action in which there is one vibration is in the upward direction. Hence, the corresponding vibration pattern number is "01". In this connection, the table that shows the correspondence between the direction and the like of the vibration and the vibration pattern number as shown in FIG. 17 is previously recorded in the recording section 124 of the main body 120 and the recording section 201 of the accessories 200*a* to 200*g*. Note that the table shown in FIG. 17 represents one example, and the parameters thereof can be appropriately changed. For example, it is not necessary to use all of the parameters of direction, size, and number of times as the vibration pattern, while on the other hand more parameters may also be used. Further, the processing that converts the vibration pattern into the vibration pattern number may be performed by the control section 203.

In this connection, even if the users of the accessories 200*b* to 200*g* perform an action that is identical to the action of the user of the camera 100, the first vibration pattern that the camera 100 detects and the second vibration patterns that the respective accessories 200*b* to 200*g* detect are not completely identical. Therefore, processing to convert the vibration pattern to the vibration pattern number is performed while taking a predetermined allowable range into account.

The control section 125 specifies (selects) an accessory whose received second vibration pattern number matches a detected first vibration pattern number as a communication candidate terminal.

Preferably, in addition to comparing the vibration pattern numbers, the control section 125 also compares the vibration detection times. More specifically, it is preferable that the control section 125 specifies as a communication candidate terminal an accessory that has transmitted second vibration information that includes a vibration detection time that is later than the vibration detection time of the detected first vibration information. This is to exclude an accessory at which a second vibration occurred prior to the first vibration from the communication candidate terminals.

Subsequently, the control section 125 graphically displays images that show the accessories that are specified as communication candidate terminals, for example, as shown in FIG. 14B (S112). Thereafter, the control section 125 determines whether or not an accessory for which communication is permitted has been selected as a communication-permitted terminal by the user of the camera 100, through the operation section, from among the accessories as the communication candidate terminals that are graphically displayed on the display section 123 (S113). If a communication-permitted terminal has not been selected (S113: No), the processing shifts to S115. In contrast, if a communication-permitted terminal is selected (S113: Yes), the control section 125 issues an instruction to transmit the image file displayed in S109 to the accessory that is the selected communication-permitted terminal (S114). Thereby, among the accessories possessed by users that performed the same specified action as the user of the camera 100, the image file recorded in the accessory 200*a* is transmitted to only accessories that are communication-permitted terminals that the user of the camera 100 selects.

After transmission of the image file, the control section 125 determines whether or not to end the playback mode (S115). For example, if an operation has been performed to switch from the playback mode to the photographing mode, or if an operation has been performed to end playback, the control section 125 determines that the playback mode is to be ended. If the control section 125 determines that the playback mode is not to be ended (S115: No), the control section 125 performs the processing of S106 and thereafter. In contrast, if the playback mode is to be ended (S115: Yes), the control section 125 performs the processing of S101 and thereafter.

Next, FIG. 16 is a flowchart that illustrates operations of the accessories 200*a* to 200*g* that constitute the communication system 101 together with the camera 100 according to the present embodiment. The control section 203 of each of the accessories 200*a* to 200*g* first determines whether or not the camera 100 is connected (S201). If the camera 100 is connected (S201: Yes), the control section 203 determines whether or not an image file has been transferred from the camera 100 through the communication section 205 (S202). If an image file has not been transferred (S202: No), the processing returns to S201. In contrast, if an image file has been transferred (S202: Yes), the control section 203 records the transferred image file in the recording section 201 (S203). Thereafter, the processing returns to S201.

Further, in S201, if the camera 100 is not connected (No), the control section 203 determines whether or not the vibration detecting section 204*b* of the vibration information detecting section 204 detected a second vibration (S204). If the second vibration is detected (S204: Yes), the vibration detecting section 204*b* identifies the vibration pattern (direction, size, and number of times) and converts the vibration pattern into a vibration pattern number by performing a comparison with respect to the conversion table shown in FIG. 17 (S205). More specifically, taking into account a predetermined allowable range, the vibration detecting section 204*b* determines whether the pattern of the second vibration matches, i.e. is similar to, any of the specified patterns that are previously registered in the conversion table (S206). In this connection, the processing that converts the vibration pattern to the vibration pattern number may be performed by the control section 203.

In S206, if the vibration pattern does not match any of the specified vibration patterns (S206: No), the processing returns to S201. In contrast, in S206, if the vibration pattern matches one of the specified vibration patterns (S206: Yes), the vibration detecting section 204*b* issues an instruction to wirelessly transmit vibration pattern number data showing the current vibration pattern and data showing the vibration detection time through the external device communication section 206 (S207). Thereafter, the processing returns to S201.

Further, in S204, if a vibration is not detected (No), the control section 203 determines whether or not a device signal can be communicated to the camera 100 (accessory 200*a*) (S208). The term "device signal" refers to a signal that the accessories 200*b* to 200*g* transmit in order to establish a communication connection with the camera 100 (accessory 200*a*). In the case of Bluetooth (registered trademark) communication, a passkey (also called a "PIN code") or the like serves as the device signal. In S208, if the device signal can be communicated, the control section 203 transmits the device signal to outside through the external device communication section 206 (S209). In contrast, if it is not possible to transmit the device signal, or if it is not necessary to transmit the device signal, the control section 203 determines whether or not it is possible to receive an image file from the accessory 200a, that is, whether or not the accessory is selected as an object for transmission of an image file (communication-permitted terminal) by the camera 100 (S210). If it is not possible to receive an image file (S210: No), the processing returns to S201. In contrast, if it is possible to receive an image file (S210: Yes), after receiving the image file from the accessory 200a (S211), the processing returns to S201.

As described above, according to the present embodiment, accessories at which a specified action is performed that is the same as a specified action that is performed at the camera 100 are taken as communication candidate terminals, and the user of the camera 100 can select communication-permitted terminals from among the communication candidate terminals based on a graphic display. It is thus possible to reliably specify a communication target while eliminating an operation to pre-register communication terminals, and to perform communication of an image file in a short time.

According to the present embodiment as described above, an example is described in which communication of an image file is performed between the accessory 200a that is mounted to the camera 100 and the accessories 200b to 200g. However, a configuration may also be adopted in which the camera 100 can communicate directly with the accessories 200b to 200g, without communicating through the accessory 200a. Further, although a camera is described as an example of a communication terminal, the technology of the present embodiment can also be applied to various kinds of communication terminals other than a camera. More specifically, although transmission of an image file is exemplified above, a file to be transmitted is not limited to an image file.

In this connection, in the foregoing description of the communication system 101, there is no specific description regarding the number of accessories that can communicate simultaneously with the accessory 200a. However, there is, generally, a limit to the number of terminals that can communicate simultaneously. For example, in the case of the Bluetooth (registered trademark) system, up to seven terminals can communicate simultaneously. When there is a limit to the number of terminals that can communicate simultaneously, terminals are taken as communication candidate terminals by, for example, giving priority to terminals whose vibration detection times are earliest after the vibration detection time of the camera 100 (accessory 200a). Further, vibration detection is repeatedly performed until the number of communication candidate terminals reaches a predetermined number.

<Sixth Embodiment>

Figure 18:
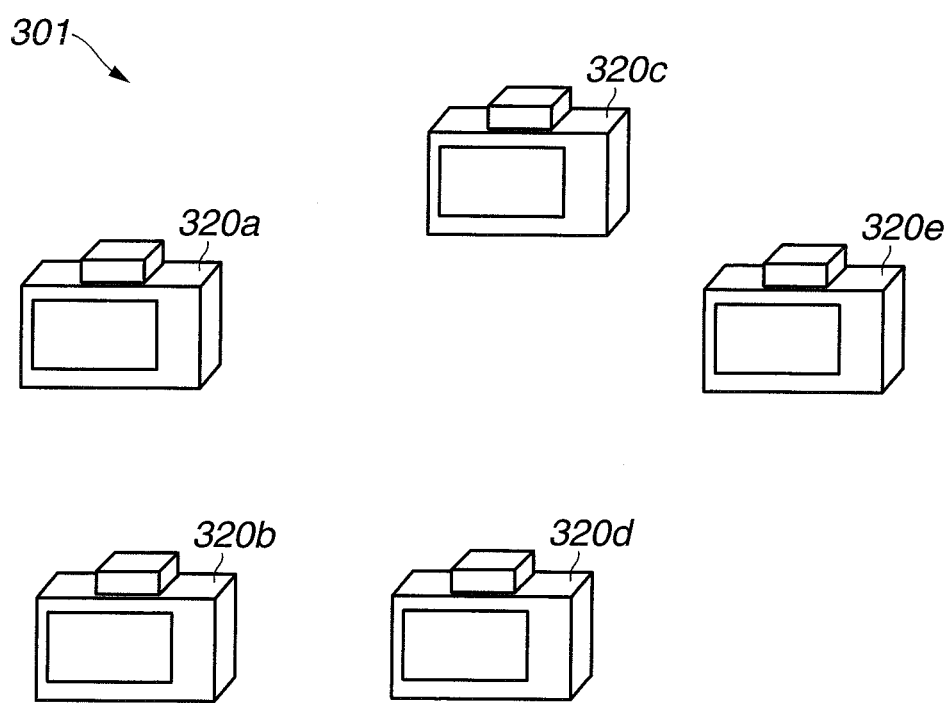
FIG. 18 is a view for describing a configuration of a communication system according to a sixth embodiment.

A communication system 301 and communication terminals (cameras 320a to 320e) constituting the communication system 301 according to a sixth embodiment that is shown in FIG. 18 perform similar control to the communication system 101 of the fifth embodiment in order to specify control target terminals (communication candidate communication terminals) as control target cameras with respect to the camera system (communication system) 1 and the camera 20 of the first embodiment.

More specifically, the respective camera selecting sections of the cameras 320a to 320e utilize vibration information (a vibration pattern generated at the camera by an action of the user that manually holds the camera, and a vibration detection time) as a camera information signal for determining whether or not a control target camera satisfies a predetermined condition.

More specifically, the cameras 320a to 320e that are communication terminals include:

a first vibration information detecting section which has a first vibration detecting section that detects a first vibration and selects a first vibration pattern type that is similar to a detected first vibration pattern from among a plurality of predetermined vibration pattern types, and a first timing section that clocks a first vibration detection time, and which outputs first vibration information including the first vibration pattern type and the first vibration detection time;

a terminal selecting section which has a second vibration detecting section that detects a second vibration and selects a second vibration pattern type that is similar to a detected second vibration pattern from among the plurality of predetermined vibration pattern types, and a second timing section that clocks a vibration detection time, and which, from among a plurality of first communication terminals that respectively have a second vibration information detecting section that outputs second vibration information including the second vibration pattern type and a second vibration detection time, a first receiving section that receives a control signal, a first image pickup section that photographs a first image based on the control signal, and a first transmitting section that transmits the first image and terminal information based on the control signal, selects the first communication terminal that satisfies a predetermined condition as a control target terminal based on the terminal information and vibration information;

a second image pickup section that photographs a second image;

a second transmitting section that transmits the control signal;

a second receiving section that receives the first image and the terminal information; and a storing section that stores the second image.

The above described communication system 301 and communication terminals (camera 320) constituting the communication system 301 combine both the advantages of the camera system 1 and communication terminals (camera 20) constituting the camera system 1 according to the first embodiment and the advantages of the communication system 101 and communication terminals 200 (camera 100) constituting the communication system 101 of the fifth embodiment.

<Additional Items>

1. A communication system, including:

a plurality of first communication terminals that respectively have a first receiving section that receives a control signal, a first image pickup section that photographs a first image based on the control signal, and a first transmitting section that transmits the first image and terminal information based on the control signal; and a second communication terminal that has a second image pickup section that photographs a second image, a second transmitting section that transmits the control signal, a second receiving section that receives the first image and the terminal information, a terminal selecting section that selects the first communication terminal that satisfies a predetermined condition from among the plurality of first communication terminals as a control target terminal based on the terminal information, and a storing section that stores the second image.

2. The communication system according to the above 1, wherein:

the terminal selecting section selects a first communication terminal that photographs a subject that is the same as a subject that the second image pickup section photographs.

3. The communication system according to the above 2, wherein:
   the first communication terminal and the second communication terminal each have a direction sensor, and the first transmitting section of the first communication terminal transmits a direction in which the first image pickup section photographs as the terminal information; and
   the terminal selecting section of the second communication terminal selects the control target terminal based on information of the direction sensors of the first communication terminal and the second communication terminal.

4. The communication system according to the above 3, wherein:
   the first and second communication terminals each have a positional information detecting sensor, and the first communication terminal transmits positional information as the terminal information; and
   the terminal selecting section of the second communication terminal selects the control target terminal based on information of the respective positional information detecting sensors of the first communication terminal and the second communication terminal.

5. The communication system according to any one of the above 1 to 4, wherein:
   the first communication terminal has a posture detection sensor and transmits posture information as the terminal information; and
   the terminal selecting section of the second communication terminal selects the control target terminal based on the posture information.

6. The communication system according to any one of the above 2 to 5, wherein the subject is a person.

7. The communication system according to any one of the above 3 to 6, wherein:
   the second communication terminal has a display section that displays the second image and a plurality of the first images; and
   the second image is displayed in a center of the display section, the first image that is photographed from a position close to the subject is displayed above the second image, and the first image that is photographed from a position far from the subject is displayed below the second image.

8. The communication system according to the above 7, wherein:
   the second image is displayed in the center of the display section, the first image that is photographed from a position that is further to a left side than the second communication terminal is displayed on the left of the second image, and the first image that is photographed from a position that is further to a right side than the second communication terminal is displayed on the right of the second image.

9. The communication system according to any one of the above 1 to 6, wherein:
   the second communication terminal has an image selecting section that selects one of the first images to be stored in the storing section from among a plurality of the first images that are displayed on the display section.

10. The communication system according to any one of the above 1 to 9, wherein:
    the first communication terminal has a function of the second communication terminal, and the second communication terminal has a function of the first communication terminal; and
    the first communication terminal and the second communication terminal each have a mode switching section that switches between a share mode that permits control based on the control signal from another image pickup apparatus and a private mode that does not permit control based on the control signal from another image pickup apparatus.

11. The communication system according to the above 10, wherein:
    the first communication terminal performs control based on the control signal from the second communication terminal only when the second communication terminal is operating in the share mode.

12. A communication terminal, including:
    a terminal selecting section that, from among a plurality of first communication terminals that respectively have a first receiving section that receives a control signal, a first image pickup section that photographs a first image based on the control signal, and a first transmitting section that transmits the first image and terminal information based on the control signal, selects the first communication terminal that satisfies a predetermined condition as a control target terminal based on the terminal information;
    a second image pickup section that photographs a second image;
    a second transmitting section that transmits the control signal;
    a second receiving section that receives the first image and the terminal information; and
    a storing section that stores the second image.

13. The communication terminal according to the above 12, wherein:
    the terminal selecting section selects a first communication terminal that photographs a subject that is the same as a subject that the second image pickup section photographs.

14. The communication terminal according to the above 13, wherein:
    the first communication terminal and the communication terminal each have a direction sensor, and the first transmitting section of the first communication terminal transmits a direction in which the first image pickup section photographs as the terminal information; and
    the terminal selecting section selects the control target terminal based on information of the direction sensors of the first communication terminal and the communication terminal.

15. The communication terminal according to the above 14, wherein:
    the first communication terminal and the communication terminal each have a positional information detecting sensor, and the first communication terminal transmits positional information as the terminal information; and
    the terminal selecting section selects the control target terminal based on information of the positional information detecting sensors of the first communication terminal and the communication terminal.

16. The communication terminal according to any one of the above 12 to 15, wherein:
    the first communication terminal has a posture detection sensor and transmits posture information as the terminal information; and
    the terminal selecting section selects the control target terminal based on the posture information.

17. The communication terminal according to any one of the above 13 to 16, wherein the subject is a person.

18. The communication terminal according to any one of the above 14 to 17, having:
    a display section that displays the second image and a plurality of the first images;
    wherein the second image is displayed in a center of the display section, the first image that is photographed from a position close to the subject is displayed above the second image, and the first image that is photographed from a position far from the subject is displayed below the second image 19. The communication terminal according to the above 18, wherein:
the second image is displayed in the center of the display section, the first image that is photographed from a position that is further to a left side than the communication terminal is displayed on the left of the second image, and the first image that is photographed from a position that is further to a right side than the communication terminal is displayed on the right of the second image.

20. The communication terminal according to any one of the above 12 to 17, having:
an image selecting section that selects one of the first images to be stored in the storing section from among a plurality of the first images that are displayed on the display section.

21. The communication terminal according to any one of the above 12 to 20, wherein:
the first communication terminal has a function of the communication terminal, and the communication terminal has a function of the first communication terminal; and
the first communication terminal and the communication terminal each have a mode switching section that switches between a share mode that permits control based on the control signal from another image pickup apparatus and a private mode that does not permit control based on the control signal from another image pickup apparatus.

22. The communication terminal according to the above 21, wherein:
the first communication terminal performs control based on the control signal from the communication terminal only when the communication terminal is operating in the share mode.

23. A communication terminal, including:
a communication section that performs communication with a plurality of communicable terminals;
a display section that displays an image;
a vibration detecting section that detects a pattern of a first vibration that occurs in the communication terminal; and
a display control section that, when the first vibration occurs, receives a pattern of a second vibration that occurred at each of the plurality of communicable terminals and an occurrence time of the second vibration from each of the plurality of communicable terminals through the communication section, and based on the second vibration patterns and second vibration occurrence times that are received, specifies a communication candidate terminal as a candidate to serve as a communication counterpart by means of the communication section from among the plurality of communicable terminals, and displays display information including an image showing the communication candidate terminal on the display section.

24. The communication terminal according to the above 23, wherein:
from among communicable terminals at which a vibration of the second pattern that matches a pattern of the first vibration occurs, the display control section specifies a plurality of communicable terminals occurrence times of the second vibration of which are highest ranking as the communication candidate terminals.

25. The communication terminal according to the above 23 or 24, wherein:
the vibration detecting section detects an occurrence time of the first vibration, and the display control section takes the communicable terminal t which the second vibration occurs at a later time than the occurrence time of the first vibration as the communication candidate terminal.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A communication system, comprising:
a plurality of first communication terminals that respectively have a first receiving section that receives a control signal, a first image pickup section that photographs a first image based on the control signal, and a first transmitting section that transmits the first image and terminal information based on the control signal; and
a second communication terminal that has a second image pickup section that photographs a second image, a second transmitting section that transmits the control signal, a second receiving section that receives the first image and the terminal information, a terminal selecting section that selects the first communication terminal that satisfies a predetermined condition from among the plurality of first communication terminals as a control target terminal based on the terminal information, and a storing section that stores the second image.

2. The communication system according to claim 1, wherein:
the terminal selecting section selects a first communication terminal that photographs a subject that is the same as a subject that the second image pickup section photographs.

3. The communication system according to claim 2, wherein:
the first communication terminal and the second communication terminal each have a direction sensor, and the first transmitting section of the first communication terminal transmits a direction in which the first image pickup section photographs as the terminal information; and
the terminal selecting section of the second communication terminal selects the control target terminal based on information of the direction sensors of the first communication terminal and the second communication terminal.

4. The communication system according to claim 3, wherein:
the first and second communication terminals each have a positional information detecting sensor, and the first communication terminal transmits positional information as the terminal information; and
the terminal selecting section of the second communication terminal selects the control target terminal based on information of the positional information detecting sensors of the first communication terminal and the second communication terminal.

5. The communication system according to claim 4, wherein:
the first communication terminal has a posture detection sensor and transmits posture information as the terminal information; and
the terminal selecting section of the second communication terminal selects the control target terminal based on the posture information.

6. The communication system according to claim 1, wherein:
the first communication terminal has a function of the second communication terminal, and the second communication terminal has a function of the first communication terminal; and
the first communication terminal and the second communication terminal each have a mode switching section that switches between a share mode that permits control based on the control signal from another image pickup apparatus and a private mode that does not permit control based on the control signal from another image pickup apparatus.

7. The communication system according to claim 6, wherein:
the first communication terminal performs control based on the control signal from the second communication terminal only when the second communication terminal is operating in the share mode.

8. A communication terminal, comprising:
a terminal selecting section that, from among a plurality of first communication terminals that respectively have a first receiving section that receives a control signal, a first image pickup section that photographs a first image based on the control signal, and a first transmitting section that transmits the first image and terminal information based on the control signal, selects the first communication terminal that satisfies a predetermined condition as a control target terminal based on the terminal information;
a second image pickup section that photographs a second image;
a second transmitting section that transmits the control signal;
a second receiving section that receives the first image and the terminal information; and
a storing section that stores the second image.

9. The communication terminal according to claim 8, wherein:
the terminal selecting section selects a first communication terminal that photographs a subject that is the same as a subject that the second image pickup section photographs.

10. The communication terminal according to claim 9, wherein:
the first communication terminal and the communication terminal each have a direction sensor, and the first transmitting section of the first communication terminal transmits a direction in which the first image pickup section photographs as the terminal information; and
the terminal selecting section selects the control target terminal based on information of the direction sensors of the first communication terminal and the communication terminal.

11. The communication terminal according to claim 10, wherein:
the first communication terminal and the communication terminal each have a positional information detecting sensor, and the first communication terminal transmits positional information as the terminal information; and
the terminal selecting section selects the control target terminal based on information of the positional information detecting sensors of the first communication terminal and the communication terminal.

12. The communication terminal according to claim 8, wherein:
the first communication terminal has a posture detection sensor and transmits posture information as the terminal information; and
the terminal selecting section selects the control target terminal based on the posture information.

13. The communication terminal according to claim 9, wherein the subject is a person.

14. The communication terminal according to claim 10, comprising:
a display section that displays the second image and a plurality of the first images;
wherein the second image is displayed in a center of the display section, the first image that is photographed from a position close to the subject is displayed above the second image, and the first image that is photographed from a position far from the subject is displayed below the second image.

15. The communication terminal according to claim 8, wherein:
the first communication terminal has a function of the communication terminal, and the communication terminal has a function of the first communication terminal; and
the first communication terminal and the communication terminal each have a mode switching section that switches between a share mode that permits control based on the control signal from another image pickup apparatus and a private mode that does not permit control based on the control signal from another image pickup apparatus.

16. The communication terminal according to claim 15, wherein:
the first communication terminal performs control based on the control signal from the communication terminal only when the communication terminal is operating in the share mode.

17. A communication terminal, comprising:
a communication section that performs wireless communication with a plurality of other communicable terminals;
a vibration information detecting section which has a vibration detecting section that detects a vibration and selects a first vibration pattern type that is similar to a detected vibration pattern from among a plurality of predetermined vibration pattern types, and a timing section that clocks a vibration detection time, and which outputs first vibration information including the first vibration pattern type and the vibration detection time;
a control section that specifies one or more communication candidate terminals from among the communicable terminals based on the first vibration information that the vibration information detecting section outputs and second vibration information that is received from the communicable terminals; and
a display section that displays an image showing the one or more communication candidate terminals that the control section specifies.

18. The communication terminal according to claim 17, wherein:
the vibration detecting section detects a vibration that is generated by an action of a user that manually holds a main body section that has the vibration detecting section.

19. The communication terminal according to claim 18, wherein:
a communicable terminal that transmits the second vibration information including a vibration pattern type that is the same as the first vibration pattern type of the first vibration information that the vibration information detecting section outputs is specified as the communication candidate terminal.

20. The communication terminal according to claim 19, further comprising:
an operation section that selects a communication-permitted terminal for which communication is permitted from among the communication candidate terminals based on images showing the communication candidate terminals that are displayed on the display section.

* * * * *